United States Patent
Miyatani

(10) Patent No.: US 8,831,420 B2
(45) Date of Patent: Sep. 9, 2014

(54) FOCUS DETECTION DEVICE, IMAGING APPARATUS, AND METHOD OF CONTROLLING FOCUS DETECTION DEVICE

(71) Applicant: Sony Corporation, Minato-ku (JP)

(72) Inventor: Yoshitaka Miyatani, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/951,963

(22) Filed: Jul. 26, 2013

(65) Prior Publication Data

US 2014/0072290 A1    Mar. 13, 2014

(30) Foreign Application Priority Data

Sep. 11, 2012 (JP) ................................. 2012-199168

(51) Int. Cl.
G03B 3/00 (2006.01)
G03B 13/32 (2006.01)

(52) U.S. Cl.
CPC .................................... G03B 13/32 (2013.01)
USPC ....................................................... 396/104

(58) Field of Classification Search
CPC ....................................................... G02B 7/34
USPC ........................................................ 396/104
See application file for complete search history.

(56) References Cited

U.S. PATENT DOCUMENTS

| 8,508,650 B2 | 8/2013 | Akamatsu et al. |
| 2011/0007176 A1* | 1/2011 | Hamano .................... 348/222.1 |
| 2011/0008031 A1* | 1/2011 | Kusaka ........................ 396/100 |

* cited by examiner

*Primary Examiner* — Clayton E LaBalle
*Assistant Examiner* — Dennis Hancock
(74) *Attorney, Agent, or Firm* — Oblon, Spivak, McClelland, Maier & Neustadt, L.L.P.

(57) ABSTRACT

There is provided a focus detection device including a phase difference acquisition unit that calculates an amount of deviation between light-reception amount distributions of a pair of light-receiving element groups arranged in a predetermined direction perpendicular to an optical axis direction as a phase difference, a conversion coefficient correction unit that corrects a conversion coefficient, representing a ratio of an amount of focus deviation in the optical axis direction to the phase difference when shapes of the light-reception amount distributions are same, according to a degree of discrepancy between the shapes of the light-reception amount distributions, and a defocus amount generation unit that generates the amount of focus deviation as an amount of defocus based on the corrected conversion coefficient and the phase difference.

8 Claims, 28 Drawing Sheets

| LENS IDENTIFICATION INFORMATION | F VALUE | LENS APERTURE INFORMATION |
|---|---|---|
| A | 1 | D_1 |
|   | 1.4 | D_2 |
|   | ⋮ | ⋮ |
| B | ⋮ | ⋮ |
| ⋮ | ⋮ | ⋮ |

| LENS IDENTIFICATION INFORMATION | F VALUE | DISCREPANCY CORRECTION COEFFICIENT |
|---|---|---|
| A | 1 | K_1 |
| | 1.4 | K_2 |
| | ⋮ | ⋮ |
| B | ⋮ | ⋮ |
| ⋮ | ⋮ | ⋮ |

FIG. 15
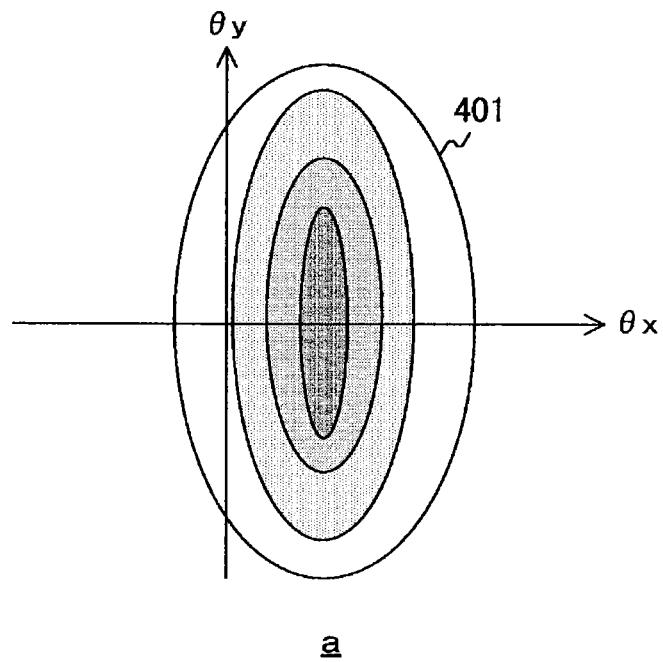
a
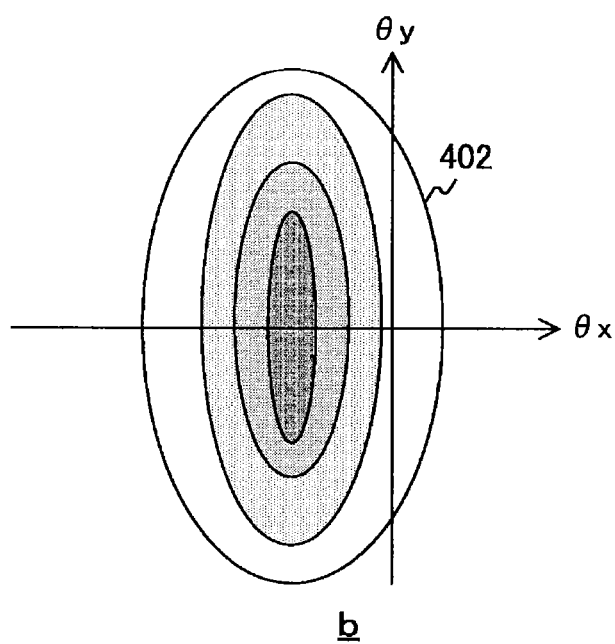
b

FIG. 16
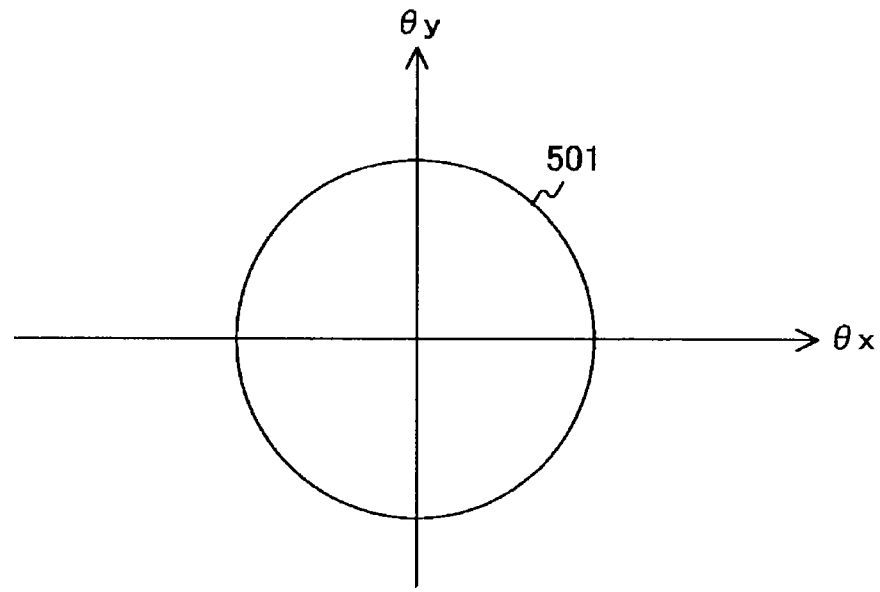
a
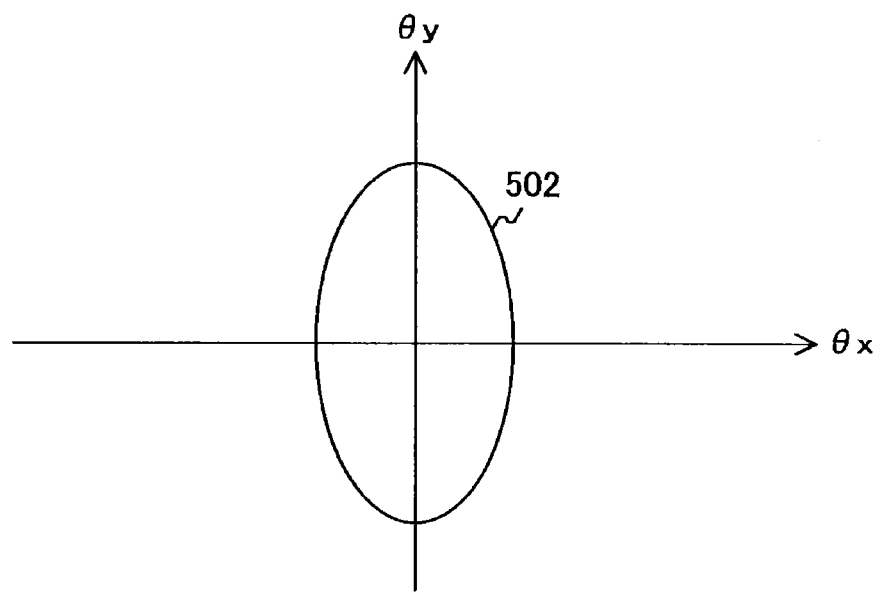
b

FIG. 17
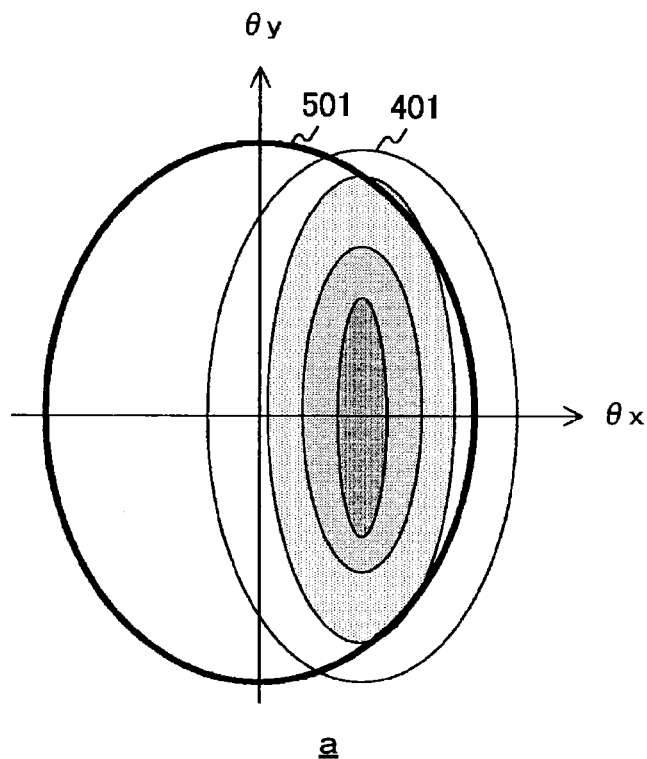
a
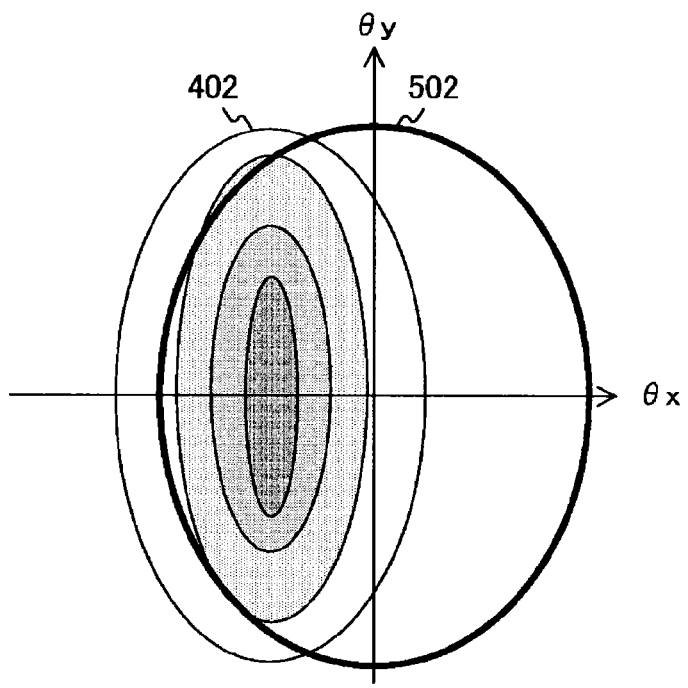
b

FIG. 18
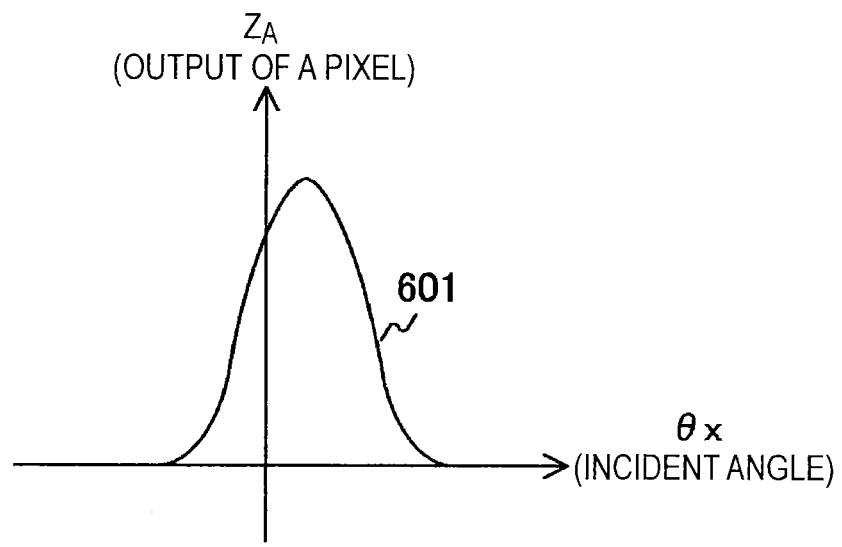
a
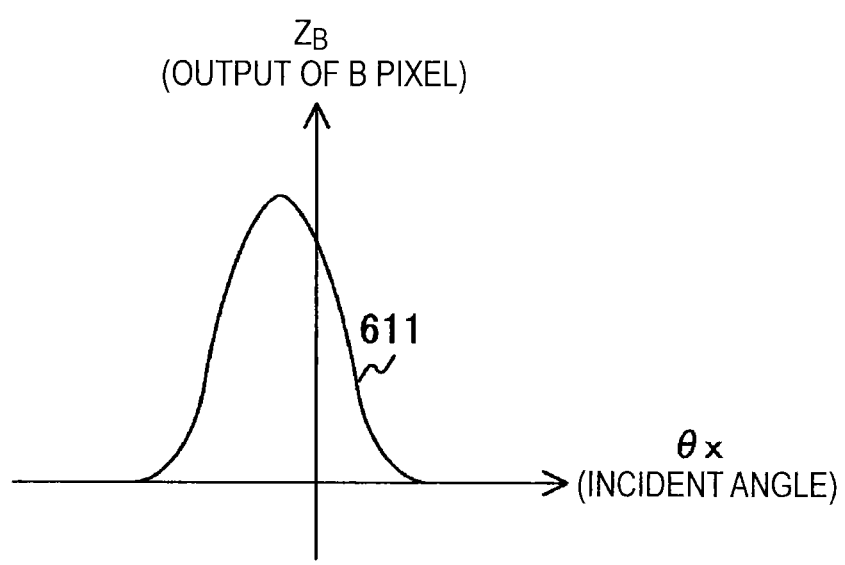
b

FIG. 19
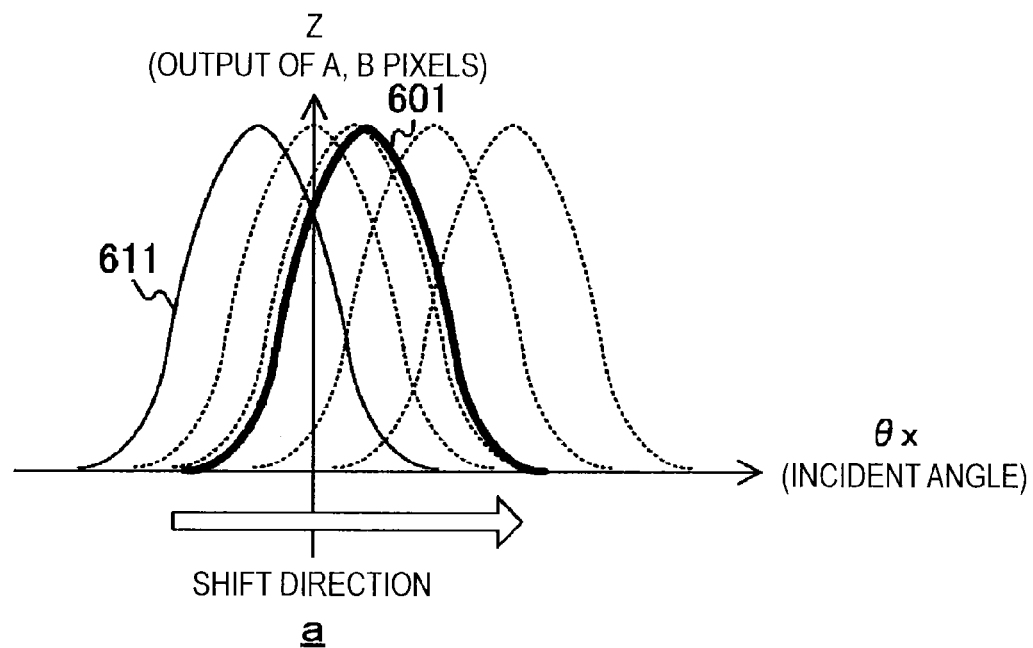
a
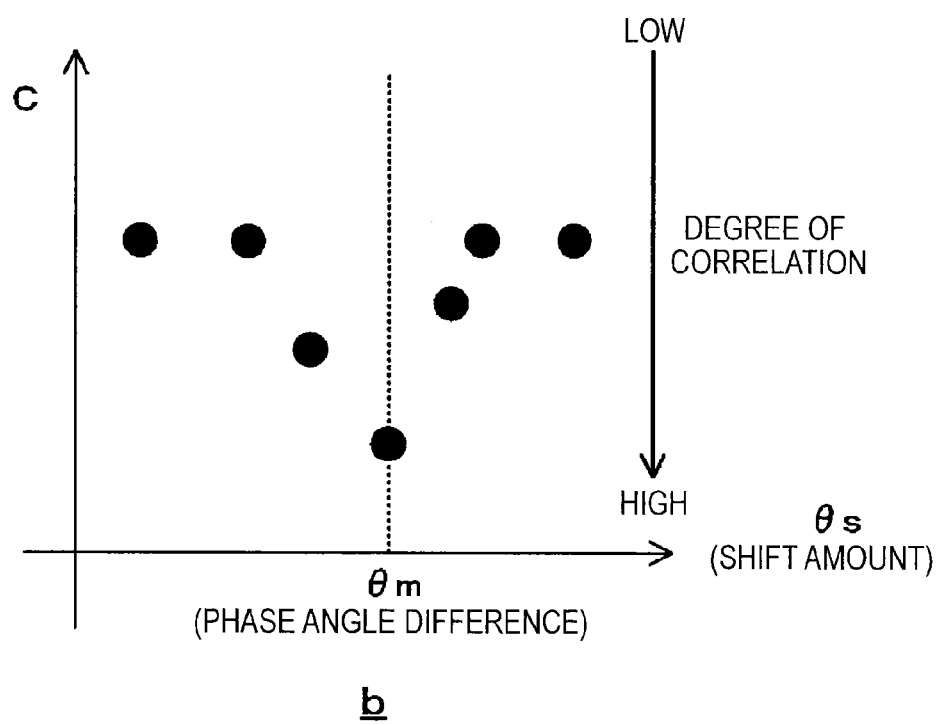
b

FIG. 21
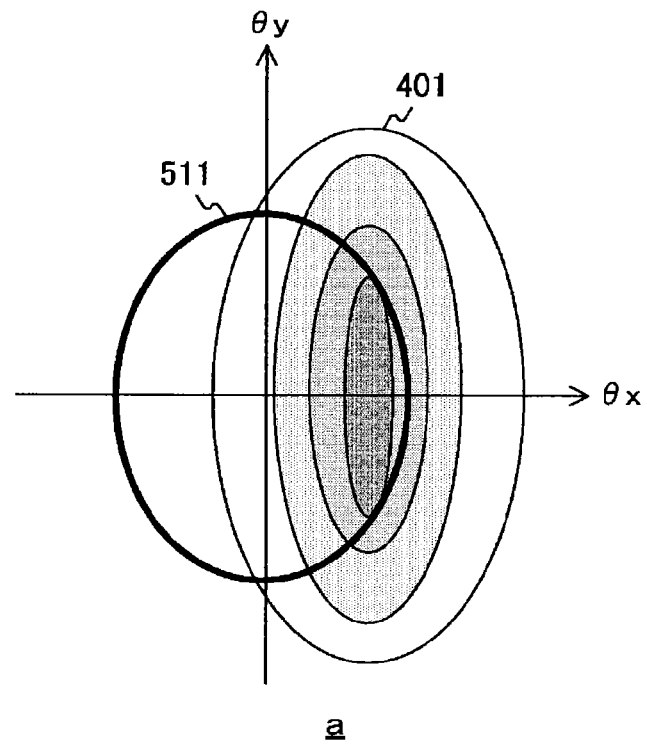
a
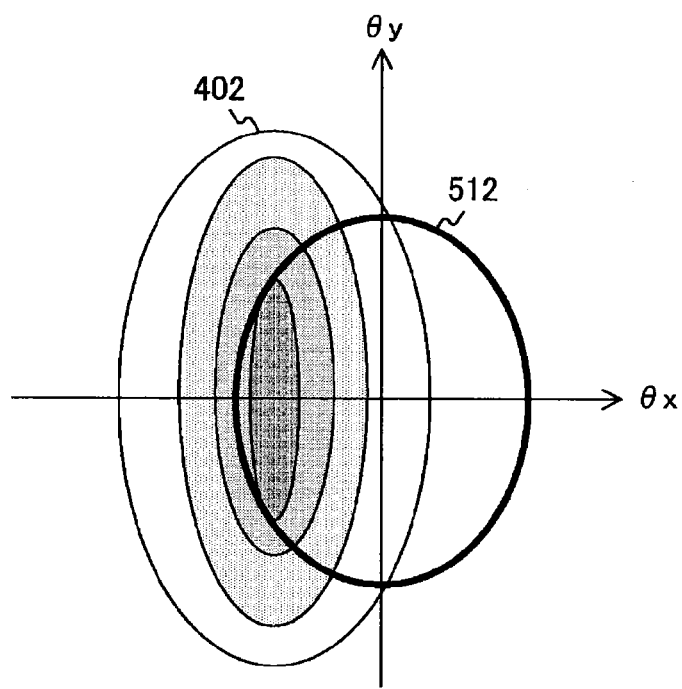
b

FIG. 22
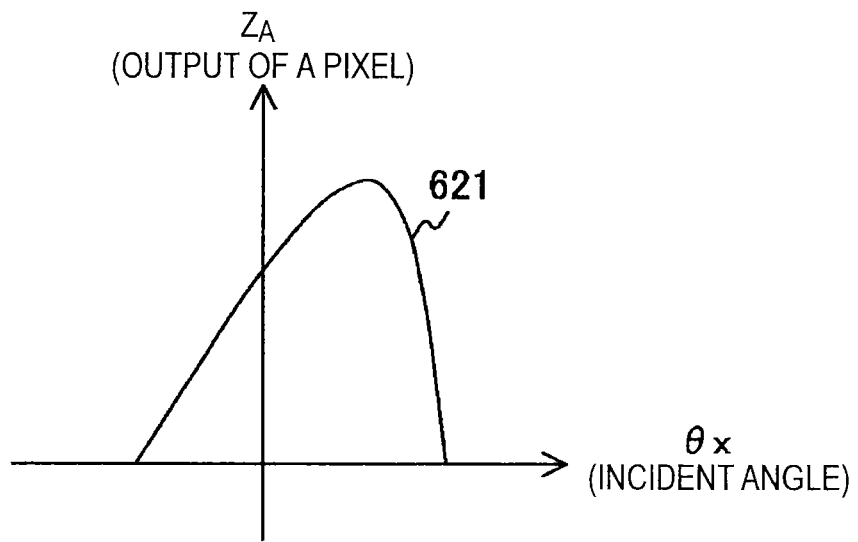
a
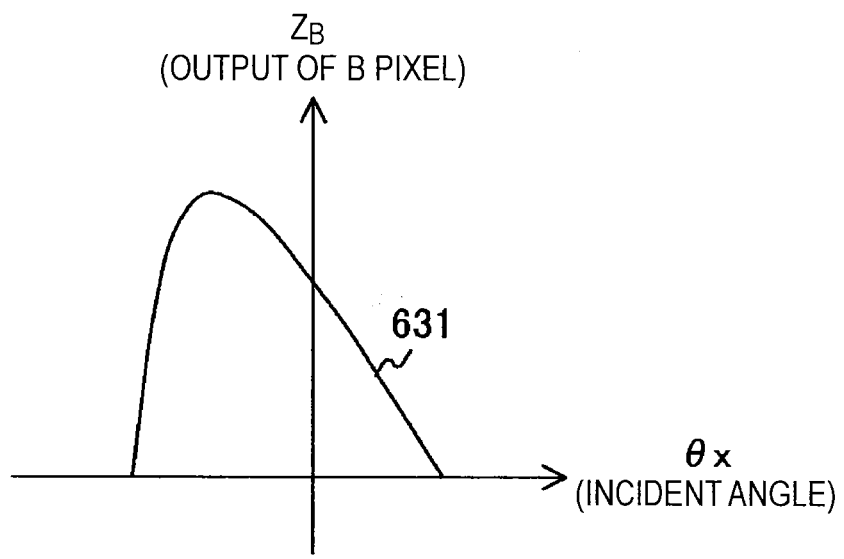
b

| LENS IDENTIFI-CATION INFORMATION | F VALUE | FOCAL DISTANCE | POINT OF FOCUS | IMAGE HEIGHT | LENS APERTURE INFORMATION |
|---|---|---|---|---|---|
| A | 1 | 24~35mm | 1m | 1mm | D_1 |
|   |   |   |   | ⋮ | ⋮ |
|   |   |   | ⋮ | ⋮ | ⋮ |
|   |   | ⋮ | ⋮ | ⋮ | ⋮ |
|   | ⋮ | ⋮ | ⋮ | ⋮ | ⋮ |
| B | ⋮ | ⋮ | ⋮ | ⋮ | ⋮ |
| ⋮ | ⋮ | ⋮ | ⋮ | ⋮ | ⋮ |

| LENS IDENTIFI-CATION INFORMATION | F VALUE | FOCAL DISTANCE | POINT OF FOCUS | IMAGE HEIGHT | DISCREPANCY CORRECTION COEFFICIENT |
|---|---|---|---|---|---|
| A | 1 | 24~35mm | 1m | 1mm | K_1 |
|  |  |  |  | ⋮ | ⋮ |
|  |  |  | ⋮ | ⋮ | ⋮ |
|  |  | ⋮ | ⋮ | ⋮ | ⋮ |
|  | ⋮ | ⋮ | ⋮ | ⋮ | ⋮ |
| B | ⋮ | ⋮ | ⋮ | ⋮ | ⋮ |
| ⋮ | ⋮ | ⋮ | ⋮ | ⋮ | ⋮ |

FOCUS DETECTION DEVICE, IMAGING APPARATUS, AND METHOD OF CONTROLLING FOCUS DETECTION DEVICE

BACKGROUND

The present technology relates to a focus detection device, an imaging apparatus, and a method of controlling the focus detection device, and more particularly, to a focus detection device that converts a phase difference into an amount of defocus using a conversion coefficient, an imaging apparatus, and a method of controlling the focus detection device.

In the past, a phase difference detection method has been known as one method of detecting focus in an imaging apparatus. The phase difference detection methods are methods of detecting focus based on a phase difference which is an amount of deviation between light-reception amount distributions generated by a pair of light-receiving element groups. In the phase difference detection method, for example, a dedicated AF module installed outside an imaging element or phase difference AF pixels installed inside the imaging element are used.

A focus detection method of shifting one of a pair of light-reception amount distributions in phase difference AF pixels or the like little by little based on the other light-reception amount distribution and calculating the degree of correlation between the shapes of the pair of light-reception amount distributions every shift time has been known. The imaging apparatus detects an amount of shift when the degree of correlation is the highest as a phase difference. The imaging apparatus calculates a value obtained by multiplying the phase difference by a predetermined conversion coefficient as an amount of defocus (for example, see Japanese Unexamined Patent Application Publication No. 2010-152006).

SUMMARY

In the above-described technology of the related art, however, there is a concern that it may be difficult to detect focus accurately. The conversion coefficient used to calculate an amount of defocus is a value based on the assumption that the shapes of a pair of light-reception amount distributions are substantially the same. However, in practice, there are cases where the shapes of the light-reception amount distributions are not substantially the same. Specifically, when the aperture of a pupil is changed due to exchange of an imaging lens, change in a stop value, or the like, an amount of received light of phase difference AF pixels or the like is changed, and thus there is a concern that the shapes of a pair of light-reception amount distributions of the phase difference AF pixels or the like may not be substantially the same. In this case, the amount of defocus calculated based on the conversion coefficient may be different from an actual value, and thus there is a concern that focus may not be detected accurately.

It is desirable to provide an imaging apparatus capable of accurately detecting focus.

According to a first embodiment of the present technology, there is provided a focus detection device and a control method thereof, the focus detection device including a phase difference acquisition unit that calculates an amount of deviation between light-reception amount distributions of a pair of light-receiving element groups arranged in a predetermined direction perpendicular to an optical axis direction as a phase difference, a conversion coefficient correction unit that corrects a conversion coefficient, representing a ratio of an amount of focus deviation in the optical axis direction to the phase difference when shapes of the light-reception amount distributions are the same, according to a degree of discrepancy between the shapes of the light-reception amount distributions, and a defocus amount generation unit that generates the amount of focus deviation as an amount of defocus based on the corrected conversion coefficient and the phase difference. Accordingly, it is possible to obtain an effect in which the conversion coefficient is corrected according to the degree of discrepancy between the shapes of the light-reception amount distributions and the amount of defocus is generated based on the corrected conversion coefficient and the phase difference.

Further, the conversion coefficient correction unit may correct the conversion coefficient based on a discrepancy correction coefficient which is a proportion of the conversion coefficient to a ratio of the amount of defocus to the phase difference when the shapes of the light-reception amount distributions are not the same. Accordingly, it is possible to obtain an effect in which the conversion coefficient is corrected based on the discrepancy correction coefficient which is the proportion of the conversion coefficient to a ratio of the amount of defocus to the phase difference when the shapes of the light-reception amount distributions are not the same.

Further, the focus detection device may further include a discrepancy correction coefficient generation unit that calculates the pair of light-reception amount distributions based on lens aperture information indicating a shape and a position of a pupil in a lens and light-reception sensitivity distribution information indicating a distribution of light-reception sensitivities of the pair of light-receiving element groups, and generates the discrepancy correction coefficient based on the pair of light-reception amount distributions. Accordingly, it is possible to obtain an effect in which the discrepancy correction coefficient based on the obtained pair of light-reception amount distributions is generated based on the lens aperture information and the light-reception sensitivity distribution information.

Further, the focus detection device may further include a discrepancy correction coefficient table that stores the discrepancy correction coefficient for each value serving as an optical parameter in an optical system. The defocus amount generation unit may acquire the discrepancy correction coefficient corresponding to a value set as the optical parameter from the discrepancy correction coefficient table. Accordingly, it is possible to obtain an effect in which the discrepancy correction coefficient corresponding to the value set as the optical parameter is acquired from the discrepancy correction coefficient table in which the discrepancy correction coefficient is stored for each value serving as the optical parameter in the optical system.

Further, the optical parameter may include a stop value. Accordingly, it is possible to obtain an effect in which the optical parameter includes the stop value.

Further, the focus detection device may further include a discrepancy correction coefficient storage unit that acquires the discrepancy correction coefficient corresponding to the value set as the optical parameter before an instruction to detect focus is given, from the discrepancy correction coefficient table, and store the discrepancy correction coefficient. When the instruction to detect the focus is given, the defocus amount generation unit may acquire the discrepancy correction coefficient from the discrepancy correction coefficient storage unit. Accordingly, it is possible to obtain an effect in which the discrepancy correction coefficient corresponding to the value set as the optical parameter before the instruction to detect the focus is given is stored in the discrepancy correction coefficient storage unit and the discrepancy correction coefficient is acquired from the discrepancy correction coefficient storage unit when the instruction to detect the focus is given.

Further, the discrepancy correction coefficient table may store the plurality of discrepancy correction coefficients in correspondence with combinations of the values of the optical parameter in the optical system and a plurality of lenses. The defocus amount generation unit may acquire the discrepancy correction coefficient corresponding to a combination of the value set as the optical parameter and a mounted lens from the discrepancy correction coefficient table. Accordingly, it is possible to obtain an effect in which the plurality of discrepancy correction coefficients are stored in correspondence with combinations of the values of the optical parameter in the optical system and the plurality of lenses, and the discrepancy correction coefficient corresponding to the combination of the value set as the optical parameter and the mounted lens is acquired from the discrepancy correction coefficient table.

Further, the focus detection device may further include an output level correction unit that uses one of output levels of the pair of light-receiving element groups as a reference value and corrects the other output level to the reference value. Accordingly, it is possible to obtain an effect in which one of output levels of the pair of light-receiving element groups is used as a reference value and the other output level is corrected to the reference value.

Further, according to a second embodiment of the present technology, there is provided an imaging apparatus including a phase difference acquisition unit that calculates an amount of deviation between light-reception amount distributions of a pair of light-receiving element groups arranged in a predetermined direction perpendicular to an optical axis direction as a phase difference, a conversion coefficient correction unit that corrects a conversion coefficient, representing a ratio of an amount of focus deviation in the optical axis direction to the phase difference when shapes of the light-reception amount distributions are the same, according to a degree of discrepancy between the shapes of the light-reception amount distributions, and a defocus amount generation unit that generates the amount of focus deviation as an amount of defocus based on the corrected conversion coefficient and the phase difference, a focusing unit that focuses a subject based on the amount of defocus, and an imaging unit that images the focused subject. Accordingly, it is possible to obtain an effect in which the conversion coefficient is corrected based on the discrepancy correction coefficient which is the proportion of the conversion coefficient to a ratio of the amount of defocus to the phase difference when the shapes of the light-reception amount distributions are not the same.

According to the embodiments of the present technology, it is possible to obtain a satisfactory advantage in which the imaging apparatus can accurately detect.

BRIEF DESCRIPTION OF THE DRAWINGS

FIG. 6 is a diagram illustrating an aperture information table according to the first embodiment;

FIG. 7 is a diagram illustrating an example of a discrepancy correction coefficient table according to the first embodiment;

FIGS. 15a and 15b are diagrams illustrating examples of light-reception sensitivity distributions of the phase difference pixels according to the first embodiment;

FIGS. 16a and 16b are diagrams illustrating examples of a pupil of an imaging lens according to the first embodiment;

FIGS. 17a and 17b are diagrams illustrating light-reception sensitivity distributions and pupils when an F value is small according to the first embodiment;

FIGS. 18a and 18b are diagrams illustrating examples of light-reception amount distributions of the phase difference pixels when an F value is small according to the first embodiment;

FIGS. 19a and 19b are diagrams illustrating a method of calculating a phase difference when an F value is small according to the first embodiment;

FIGS. 21a and 21b are diagrams illustrating light-reception sensitivity distributions and pupils when an F value is large according to the first embodiment;

FIGS. 22a and 22b are diagrams illustrating examples of light-reception amount distributions of the phase difference pixels when an F value is large according to the first embodiment;

FIG. 28 is a diagram illustrating an example of an aperture information table according to a second embodiment; and FIG. 29 is a diagram illustrating an example of a discrepancy correction coefficient table according to the second embodiment.

DETAILED DESCRIPTION OF THE EMBODIMENTS

Figure 1:
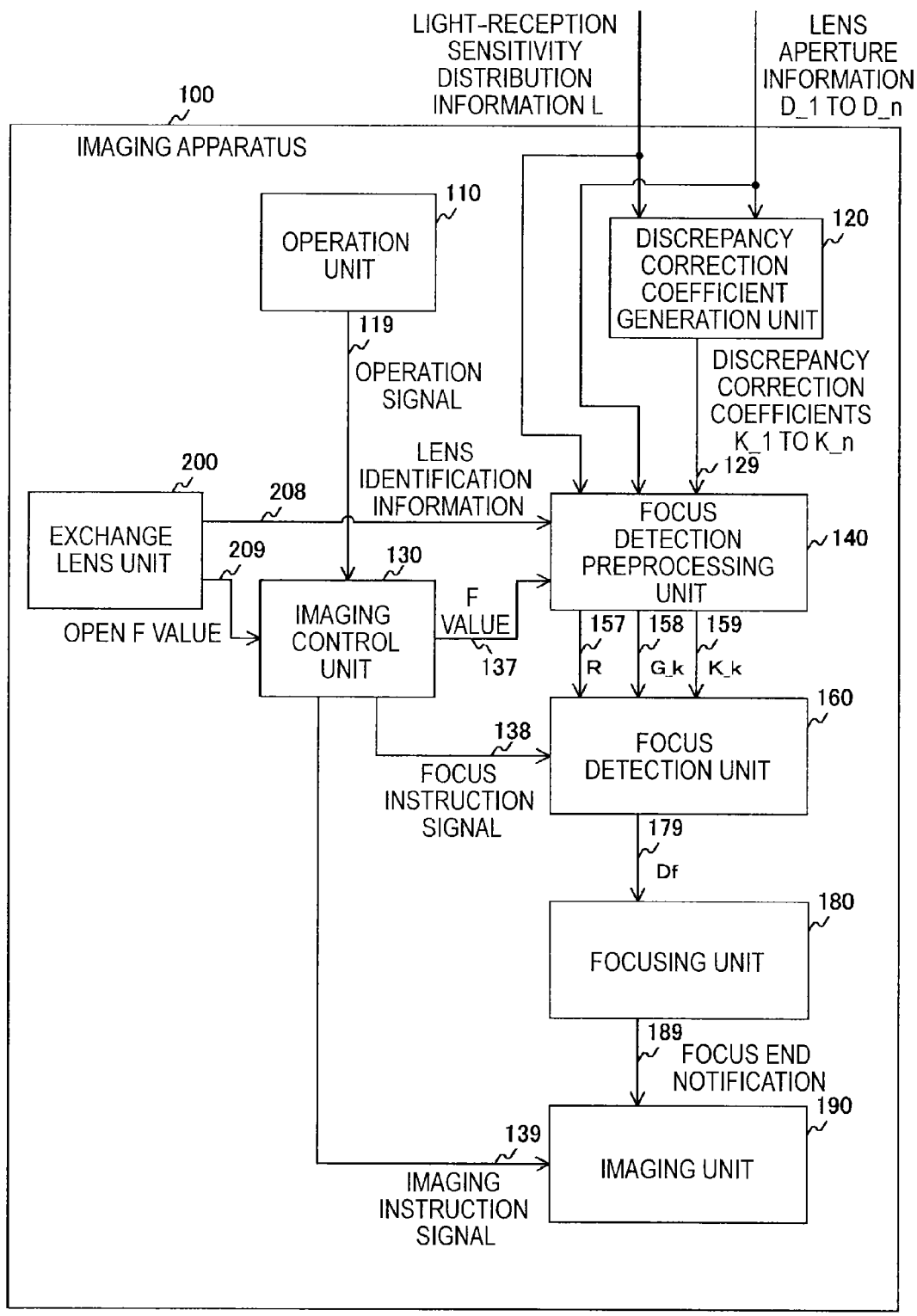
FIG. 1 is a block diagram illustrating an example of the configuration of an imaging apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as embodiments) for carrying out the present technology will be described. The description will be made in the following order.

1. First embodiment (example in which conversion coefficient is corrected according to degree of discrepancy)
2. Second embodiment (example in which conversion coefficient is corrected according to degree of discrepancy calculated based on optical parameter)

1. First Embodiment

Example of Configuration of Imaging Apparatus

FIG. 1 is a block diagram illustrating an example of the configuration of an imaging apparatus 100 according to a first embodiment. The imaging apparatus 100 includes an operation unit 110, a discrepancy correction coefficient generation unit 120, an imaging control unit 130, a focus detection preprocessing unit 140, a focus detection unit 160, a focusing unit 180, an imaging unit 190, and an exchange lens unit 200.

The exchange lens unit 200 is a unit that acquires information regarding a mounted imaging lens. When an imaging lens is mounted, the exchange lens unit 200 acquires lens identification information used to identify the imaging lens and supplies the lens identification information to the focus detection preprocessing unit 140 via a signal line 208. The exchange lens unit 200 acquires an open F value of the mounted imaging lens and supplies the open F value to the imaging control unit 130 via a signal line 209. The open F value is an F value when a stop of the imaging lens is fully opened. The F value is a ratio of an effective aperture of the imaging lens to a focal distance.

The operation unit 110 is a unit that includes a switch or a button and generates an operation signal according to a user's operation on the switch or the button. The button includes, for example, a two-stage type shutter button. An instruction to start focusing is given by an operation of pressing the shutter button halfway and an instruction to start imaging is given by an operation of fully pressing the shutter button. The operation unit 110 supplies the generated operation signal to the imaging control unit 130 via a signal line 119. Further, the instruction to start focusing may be configured to be given by an operation other than the operation of pressing the shutter button halfway.

The discrepancy correction coefficient generation unit 120 is a unit that generates a discrepancy correction coefficient. Here, the discrepancy correction coefficient is a coefficient used to correct a conversion coefficient according to the degree of discrepancy between the shapes of light-reception amount distributions of a pair of light-receiving element groups. The light-receiving element group includes elements arranged in a direction perpendicular to an optical axis direction on the imaging element and is used to detect a phase difference. Further, the conversion coefficient is a ratio of an amount of defocus to a phase difference when the shapes of the light-reception amount distributions are substantially the same. The phase difference is an amount of deviation between the light-reception amount distributions of a pair of light-receiving element groups. The amount of defocus is an amount of focus deviation in the optical axis direction.

Hereinafter, a pixel including light-receiving elements belonging to one of a pair of light-receiving element groups is referred to as a "pixel A" and a pixel including light-receiving elements belonging to the other light-receiving element group is referred to as a "pixel B." The discrepancy correction coefficient generation unit 120 generates discrepancy correction coefficients $K\_1$ to $K\_n$ (where n is an integer) based on light-reception sensitivity distribution information L and lens aperture information $D\_1$ to $D\_n$. The discrepancy correction coefficient generation unit 120 supplies the generated discrepancy correction coefficients $K\_1$ to $K\_n$ to the focus detection preprocessing unit 140 via a signal line 129. Such discrepancy correction coefficients $K\_1$ to $K\_n$ are generated, for example, at the time of factory shipment, repair, or the like of the imaging apparatus 100.

Here, the light-reception sensitivity distribution information L is information that indicates a light-reception sensitivity distribution of each of the pixels A and B. Further, the lens aperture information $D\_1$ to $D\_n$ is information that indicates the shape and the position of a pupil in the imaging lens. The shape or the position of the pupil differs depending on an amount of defocus, a kind of imaging lens, an F value, or the like. The diameter of the pupil when the stop is fully opened is a value corresponding to a physical diameter of the imaging lens. As the stop is narrowed by changing an F value, the diameter of the pupil decreases. Further, when the amount of defocus is changed, the degree of dilation or the position of the pupil is changed. Therefore, with regard to a given amount of defocus, lens aperture information is prepared for each of combinations of imaging lenses and F values and is input to the imaging apparatus 100. For example, with regard to n combinations of n imaging lenses, in which the amount of defocus is a predetermined value (hereinafter referred to as a "reference amount of defocus"), and F values, n pieces of lens aperture information are input to the imaging apparatus 100. The reference amount of defocus is set to, for example, a value of "1−s." Here, s is a value obtained by converting a distance between the pixels A and B into a distance in a defocus direction.

The discrepancy correction coefficient generation unit 120 generates the discrepancy correction coefficient for each of the combinations of the imaging lenses and the F values. However, in an imaging apparatus in which an imaging lens is not exchanged, it is not necessary to generate a discrepancy correction coefficient for each imaging lens. In this case, the discrepancy correction coefficient generation unit 120 generates a discrepancy correction coefficient for each F value.

The imaging control unit 130 is a unit that controls the entire imaging apparatus 100. When the imaging control unit 130 receives an open F value from the exchange lens unit 200, the imaging control unit 130 maintains the open F value as a current F value and changes the F value as necessary. For example, the imaging control unit 130 changes the F value according to an operation signal from the operation unit 110. The imaging control unit 130 changes the F value based on an imaging mode or an amount of photometry from a photometry sensor. The imaging control unit 130 supplies the current F value to the focus detection preprocessing unit 140 via a signal line 137.

The imaging control unit 130 generates a focus instruction signal used to give an instruction to start focusing at a timing at which the focusing starts and supplies the focus instruction signal to the focus detection unit 160 via a signal line 138. The timing at which the focusing starts is, for example, a time at which a timer value of a self timer becomes a set value or a time at which the shutter button is pressed halfway.

Further, the imaging control unit 130 generates an imaging instruction signal used to give an instruction to start imaging at a timing at which an image is captured, and supplies the imaging instruction signal to the imaging unit 190 via a signal line 139. The timing at which imaging starts is, for example, a time at which a timer value of a self timer becomes a set value or a time at which the shutter button is fully pressed.

The focus detection preprocessing unit 140 is a unit that acquires a discrepancy correction coefficient corresponding to a combination of a mounted imaging lens and a set F value among the plurality of discrepancy correction coefficients before focus detection. The focus detection preprocessing unit 140 receives the discrepancy correction coefficients K__1 to K_n from the discrepancy correction coefficient generation unit 120 and stores the discrepancy correction coefficients K__1 to K_n. When the lens identification information is received from the exchange lens unit 200 and an F value is received from the imaging control unit 130, a discrepancy correction coefficient K_k corresponding to a combination of the lens identification information and the F value is acquired among the discrepancy correction coefficients K__1 to K_n. Here, "k" is an integer from 1 to n. The focus detection preprocessing unit 140 supplies the acquired discrepancy correction coefficient K_k to the focus detection unit 160 via a signal line 159.

Further, the focus detection preprocessing unit 140 generates an output level ratio R and a centroid gap G_k. Here, the output level ratio R is a ratio of the output level of one of the pixels A and B to the output level of the other pixel. With regard to the output level ratio R, one of the pixels A and B is used as a reference in order to correct the output level of the other pixel. The centroid gap G_k is a gap between the centroids of a pair of light-reception amount distributions. The reciprocal of the centroid gap G_k is used as the conversion coefficient. The focus detection preprocessing unit 140 supplies the generated output level ratio R and the generated centroid gap G_k to the focus detection unit 160 via signal lines 157 and 158.

The focus detection unit 160 corrects a conversion coefficient based on the discrepancy correction coefficient K_k and detects focus based on the corrected conversion coefficient and a phase difference. When the focus detection unit 160 receives the focus instruction signal from the imaging control unit 130, the focus detection unit 160 starts detecting focus. In the detection of the focus, the focus detection unit 160 corrects the output level of one of the pixels A and B based on the output level ratio R. The focus detection unit 160 generates a conversion coefficient based on the centroid gap G_k and corrects the conversion coefficient based on the discrepancy correction coefficient K_k. The focus detection unit 160 converts the phase difference into an amount of defocus Df based on the corrected conversion coefficient. The focus detection unit 160 supplies the amount of defocus Df to the focusing unit 180 via a signal line 179. Further, the focus detection unit 160 is an example of a focus detection device according to an embodiment of the present technology.

The focusing unit 180 performs a focusing process to focus a subject. When the focusing unit 180 receives the amount of defocus Df from the imaging control unit 130, the focusing unit 180 performs the focusing process of changing the position of a focusing lens in the imaging lens by only a distance according to the amount of defocus Df. When the focusing process ends, the focusing unit 180 generates a focus end notification to notify of the end of the focusing and supplies the focus end notification to the imaging unit 190 via a signal line 189.

The imaging unit 190 captures an image under the control of the imaging control unit 130. When the imaging unit 190 receives the focus end notification from the focusing unit 180 and receives an imaging instruction signal from the imaging control unit 130, the imaging unit 190 captures an image.

Figure 2:
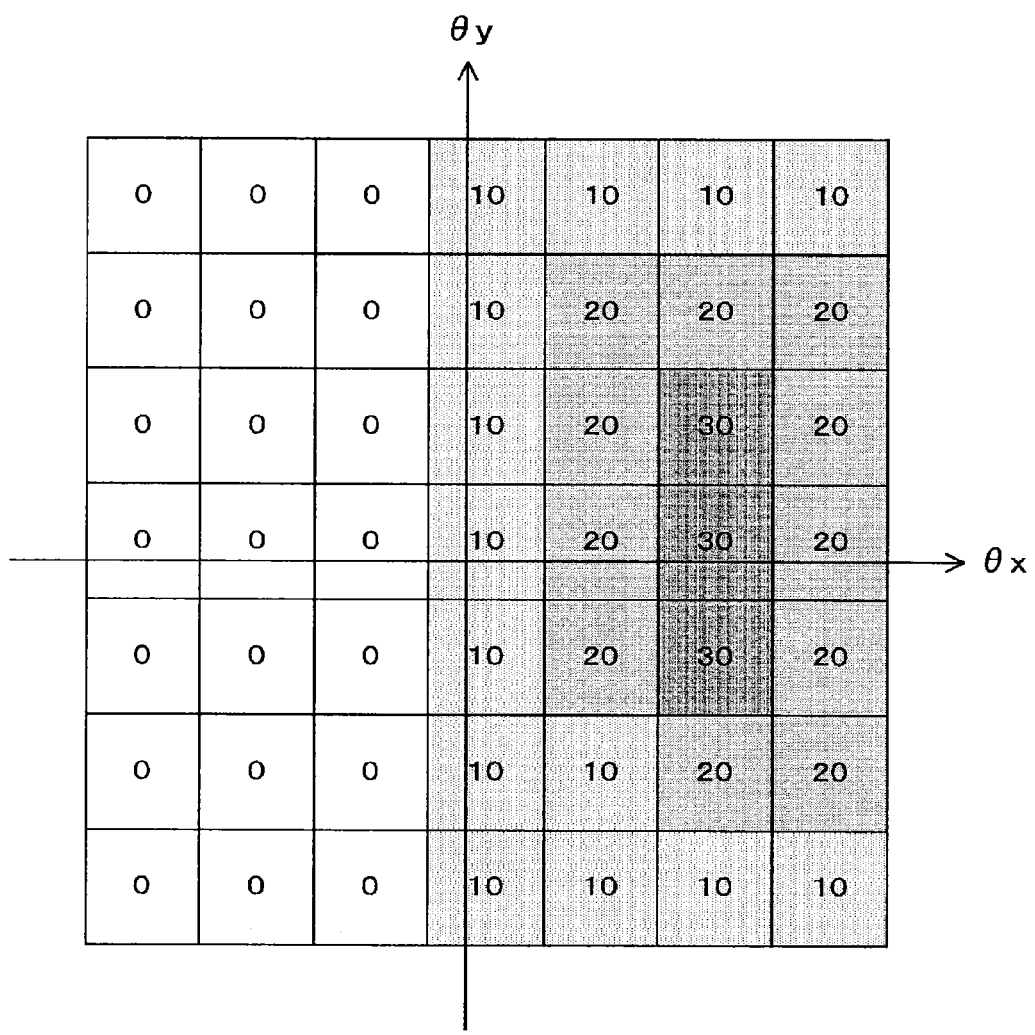
FIG. 2 is a diagram illustrating an example of light-reception sensitivity distribution information according to the first embodiment.

FIG. 2 is a diagram illustrating an example of the light-reception sensitivity distribution information L according to the first embodiment. In FIG. 2, the vertical axis represents an incident angle $\theta x$ of light of the x axis direction incident on a phase difference pixel. The horizontal axis represents an incident angle $\theta y$ of the light of the y axis direction incident on the phase difference pixel. Units of the incident angles $\theta x$ and $\theta y$ are, for example, "degrees." Further, a numerical value in FIG. 2 indicates a value of light-reception sensitivity of the phase difference pixel. A unit of the light-reception sensitivity is, for example, milliamperes/watt (mA/W). Here, the x axis is an axis parallel to an image surface on which the phase difference pixels are disposed. Further, the y axis is an axis perpendicular to the x axis and parallel to the image surface on which the phase difference pixels are disposed. The light-reception sensitivity distribution information L includes information indicating a light-reception sensitivity for each combination of the incident angles $\theta x$ and $\theta y$ with regard to each phase difference pixel. For example, the light-reception sensitivity of light of which the incident angles $\theta x$ and $\theta y$ are both "0" is "10." Further, the light-reception sensitivity distribution is symmetric when an axis (for example, a $\theta x$ axis) in a direction in which a phase difference is detected is set as a boundary. The light-reception sensitivity distribution is asymmetric when an axis (for example, a $\theta y$ axis) perpendicular to this axis is set as a boundary.

Figure 3:
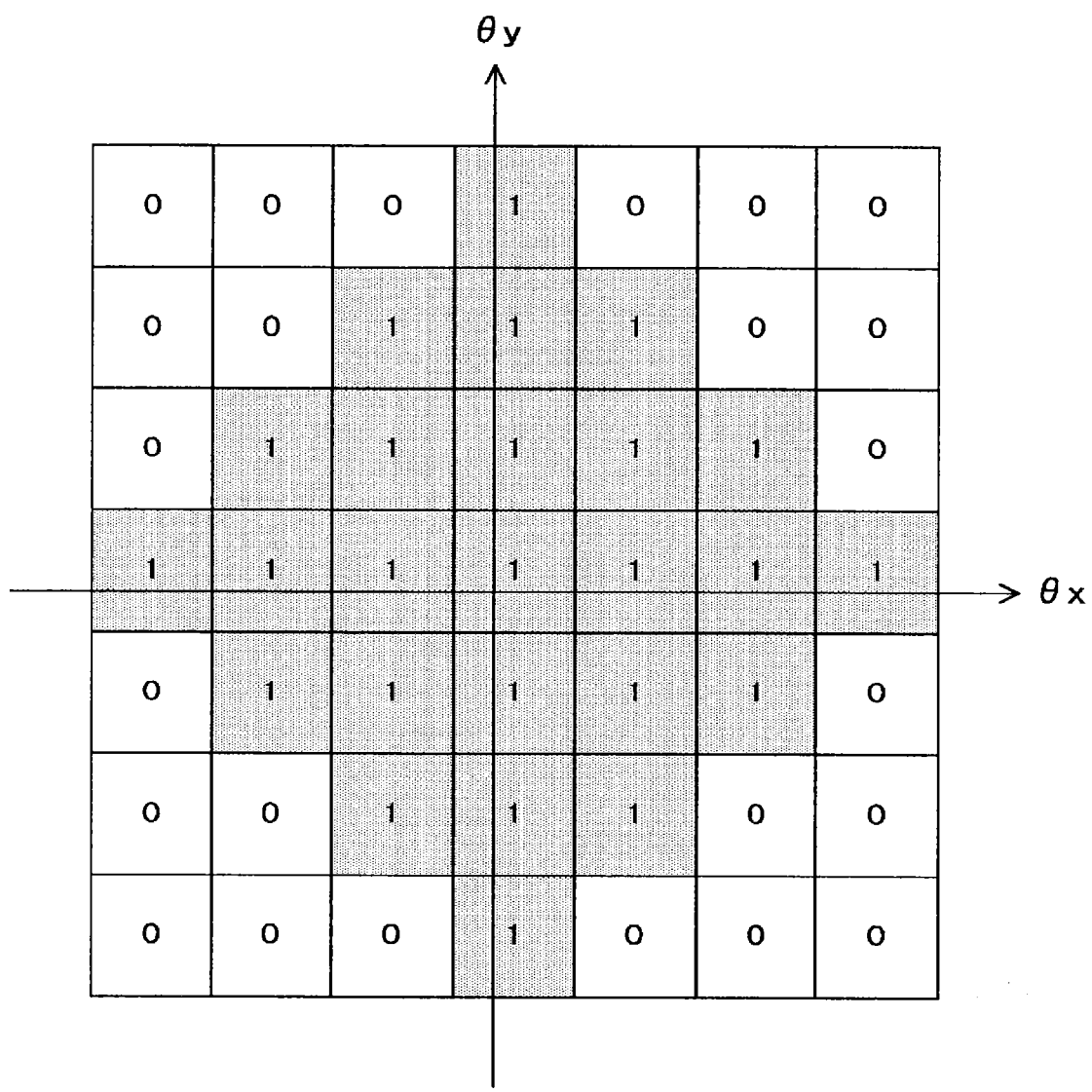
FIG. 3 is a diagram illustrating an example of lens aperture information according to the first embodiment.

FIG. 3 is a diagram illustrating an example of lens aperture information D_k according to the first embodiment. An incident angle $\theta x$ of the horizontal axis and an incident angle $\theta y$ of the vertical axis in FIG. 3 are the same as the incident angles in FIG. 2. Numerical values in FIG. 3 indicate whether light at incident angles $\theta x$ and $\theta y$ is light within a pupil of a lens. For example, a numerical value "1" indicates that the light is light within the pupil and a numerical value "0" indicates that the light is not light within the pupil and that the light at the incident angles is shielded by a lens frame or the like and is thus not incident on the phase difference pixels. The lens aperture information D_k includes information indicating whether light is light within a pupil for each of the combinations of the incident angles $\theta x$ and $\theta y$ with regard to each phase difference pixel.

[Example of Configuration of Discrepancy Correction Coefficient Generation Unit]

Figure 4:
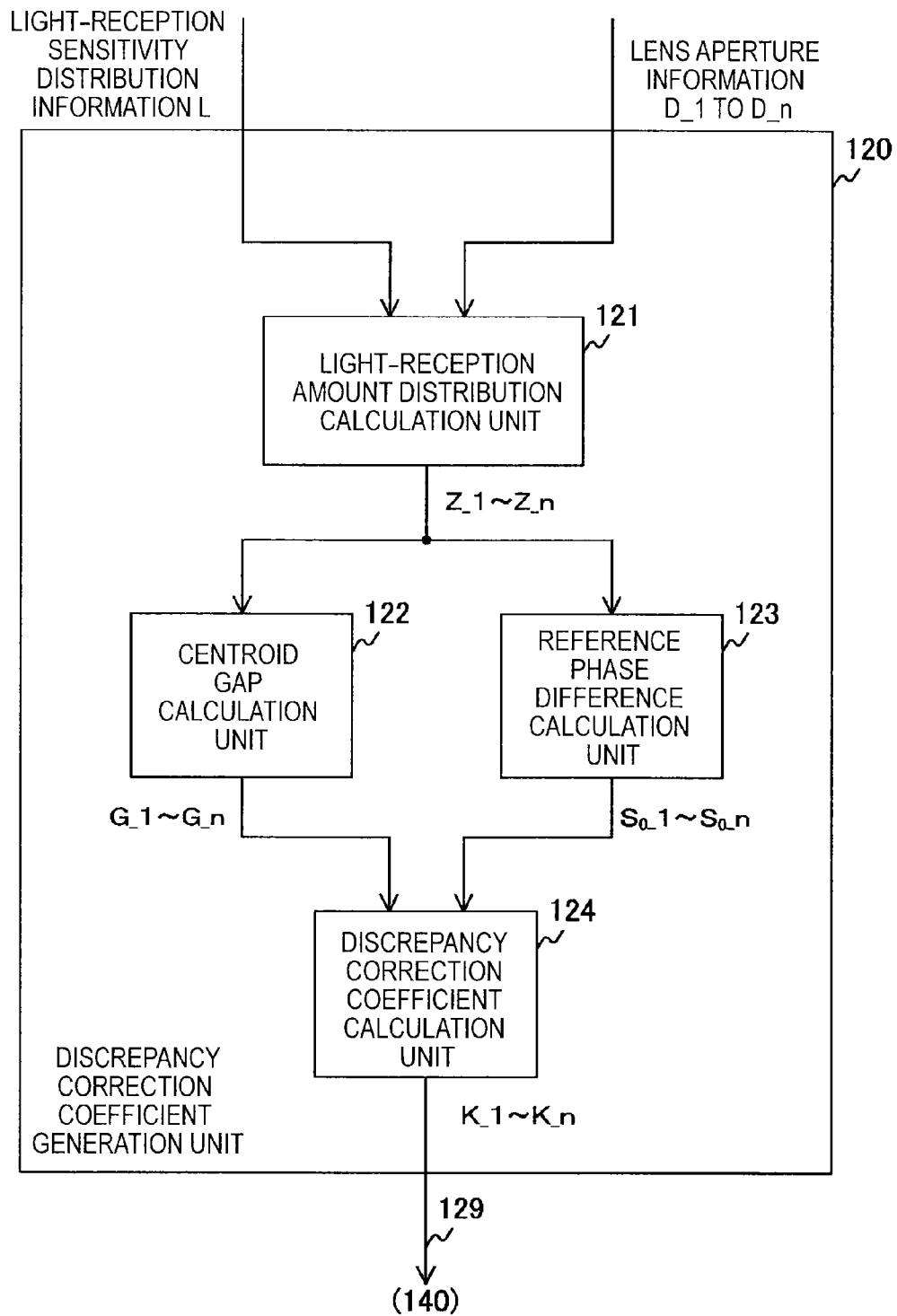
FIG. 4 is a block diagram illustrating an example of the configuration of a discrepancy correction coefficient generation unit according to the first embodiment.

FIG. 4 is a block diagram illustrating an example of the configuration of the discrepancy correction coefficient generation unit 120 according to the first embodiment. The discrepancy correction coefficient generation unit 120 includes a light-reception amount distribution calculation unit 121, a centroid gap calculation unit 122, a reference phase difference calculation unit 123, and a discrepancy correction coefficient calculation unit 124.

The light-reception amount distribution calculation unit 121 is a unit that calculates light-reception amount distributions Z__1 to Z_n based on the light-reception sensitivity distribution information L and the lens aperture information D__1 to D_n. For example, the light-reception amount distribution calculation unit 121 calculates the light-reception amount distributions Z__1 to Z_n, which each include $Z_A$ and $Z_B$, using Equation 1 and Equation 2 below. The light-reception amount distribution calculation unit 121 supplies the calculated light-reception amount distributions Z__1 to Z_n to the centroid gap calculation unit 122 and the reference phase difference calculation unit 123.

$$Z_A(\theta_x) = \sum_{\theta_y} L_A(\theta_x, \theta_y) \cdot D(\theta_x, \theta_y) \qquad \text{Equation 1}$$

$$Z_B(\theta_x) = \sum_{\theta_y} L_B(\theta_x, \theta_y) \cdot D(\theta_x, \theta_y) \qquad \text{Equation 2}$$

Here, in Equation 1, $L_A(\theta_x, \theta_y)$ is a light-reception sensitivity of the pixel A with regard to light at incident angles $\theta_x$ and $\theta_y$. Further, $D(\theta_x, \theta_y)$ is information indicating whether the light at the incident angles $\theta_x$ and $\theta_y$ is light within a pupil. $Z_A(\theta_x)$ is an output level of the pixel A according to an amount of the received light at the incident angle $\theta_x$. In Equation 2, $L_B(\theta_x, \theta_y)$ is a light-reception sensitivity of the pixel B with regard to light at incident angles $\theta_x$ and $\theta_y$, and $Z_B(\theta_x)$ is an output level of the pixel B according to an amount of the received light at the incident angle $\theta_x$.

The centroid gap calculation unit 122 calculates a gap between a centroid of a light-reception amount distribution of the pixel A and a centroid of a light-reception amount distribution of the pixel B in each of the light-reception amount distributions Z__1 to Z_n. For example, the centroid gap calculation unit 122 calculates centroid gaps G__1 to G_n using Equation 3 to Equation 5 below. The centroid gap calculation unit 122 supplies the calculated centroid gaps G__1 to G_n to the discrepancy correction coefficient calculation unit 124.

$$G_A = \frac{\sum_{\theta_x} Z_A(\theta_x) \cdot \theta_x}{\sum_{\theta_x} Z_A(\theta_x)} \qquad \text{Equation 3}$$

$$G_B = \frac{\sum_{\theta_x} Z_B(\theta_x) \cdot \theta_x}{\sum_{\theta_x} Z_B(\theta_x)} \qquad \text{Equation 4}$$

$$G = |\tan G_A - \tan G_B| \qquad \text{Equation 5}$$

The reference phase difference calculation unit 123 is a unit that calculates reference phase differences $S_{0\_1}$ to $S_{0\_n}$ based on the light-reception amount distributions Z__1 to Z_n. The reference phase differences $S_{0\_1}$ to $S_{0\_n}$ are phase differences when a reference amount of defocus is obtained and are calculated based on the light-reception amount distributions Z__1 to Z_n.

In the calculation of the reference phase difference, the reference phase difference calculation unit 123 performs correlation calculation. The correlation calculation is expressed by, for example, Equation 6 below.

$$C(\theta_s) = \sum_{\theta_x} |Z_A(\theta_x) - Z_B(\theta_x + \theta_s)| \qquad \text{Equation 6}$$

In Equation 6, $\theta_s$ is an amount of shift of the light-reception amount distribution of the pixel B and $C(\theta_s)$ is a correlation calculation result when the amount of shift is $\theta_s$. Here, the correlation calculation result is a value according to the degree of correlation between the shape of the light-reception amount distribution $Z_A$ of the pixel A and the shape of the light-reception amount distribution $Z_B$ of the pixel B. The smaller the value of the correlation calculation result $C(\theta_s)$ is, the higher the degree of correlation is. The reference phase difference calculation unit 123 determines an amount of shift $\theta_s$ by which the highest degree of correlation is obtained as a phase angle difference $\theta_{m0}$ by performing correlation calculation in a plurality of amounts of shift $\theta_s$. Further, the reference phase difference calculation unit 123 calculates $\tan \theta_{m0}$ as a reference phase difference $S_0$. The reference phase difference calculation unit 123 supplies the discrepancy correction coefficient calculation unit 124 with the reference phase differences $S_{0\_1}$ to $S_{0\_n}$ generated based on the light-reception amount distributions Z__1 to Z_n.

The discrepancy correction coefficient calculation unit 124 is a unit that calculates the discrepancy correction coefficients K__1 to K_n based on the centroid gaps G__1 to G_n and the reference phase differences $S_{0\_1}$ to $S_{0\_n}$. The discrepancy correction coefficient calculation unit 124 calculates the discrepancy correction coefficients K__1 to K_n using, for example, Equation 7 below. The discrepancy correction coefficient calculation unit 124 supplies the calculated discrepancy correction coefficients K__1 to K_n to the focus detection preprocessing unit 140.

$$K = \frac{G}{S_o} = \frac{G}{\tan \theta_{mo}} \qquad \text{Equation 7}$$

Here, on the assumption that Si is a reference phase difference corresponding to the reference amount of defocus in an ideal case in which the shapes of a pair of light-reception amount distributions are substantially the same, as described above, the reference phase difference Si becomes equal to the centroid gap G. Therefore, a proportion of the centroid gap G (that is, the reference phase difference Si) to the reference phase difference S0 becomes a proportion of the conversion coefficient to a ratio of an amount of defocus to a phase difference of a non-ideal case. Accordingly, by correcting the conversion coefficient using this proportion, an accurate amount of defocus is calculated.

[Example of Configuration of Focus Detection Preprocessing Unit]

Figure 5:
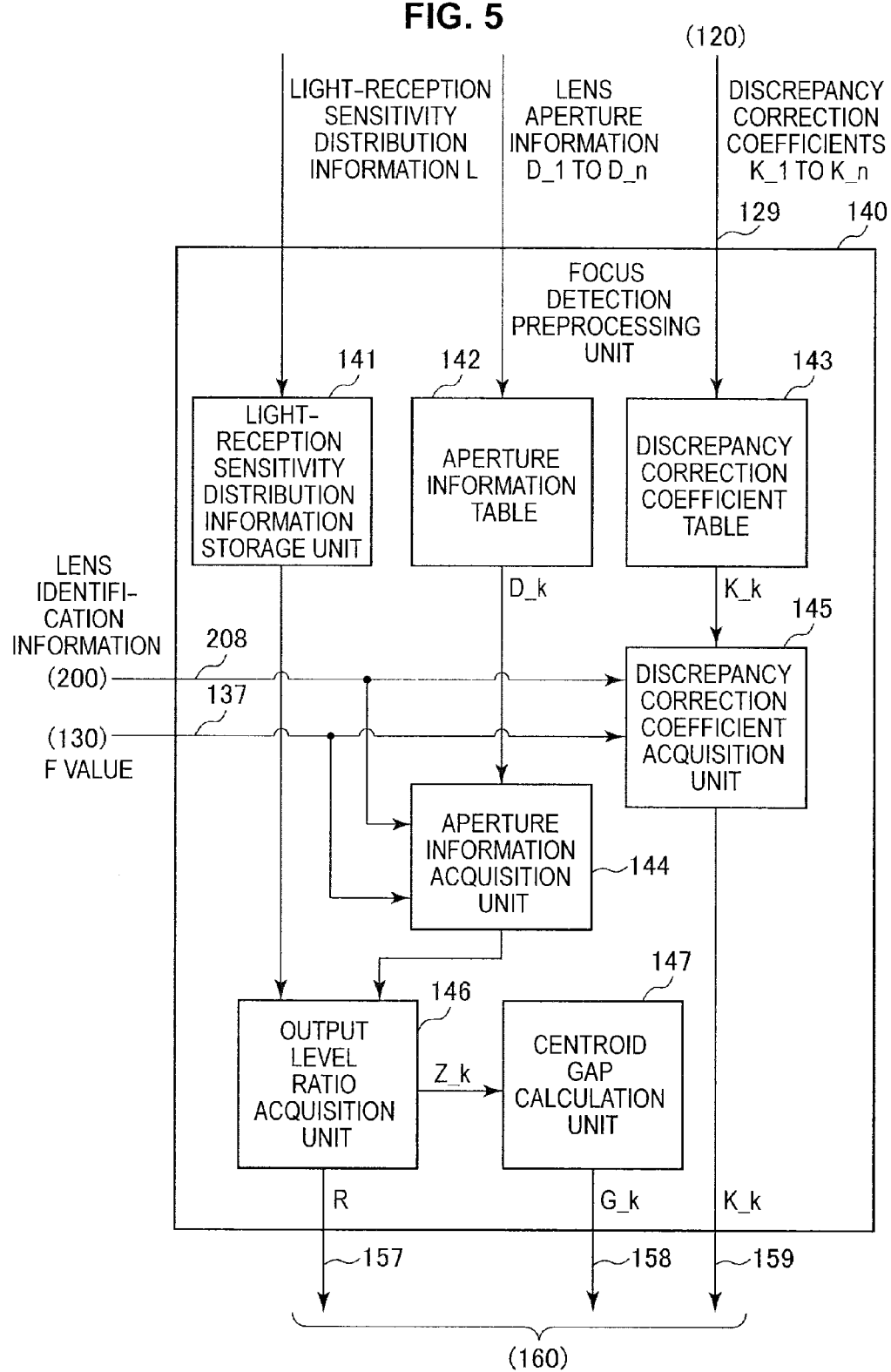
FIG. 5 is a block diagram illustrating an example of the configuration of a focus detection preprocessing unit according to the first embodiment.

FIG. 5 is a block diagram illustrating an example of the configuration of the focus detection preprocessing unit 140 according to the first embodiment. The focus detection preprocessing unit 140 includes a light-reception sensitivity distribution information storage unit 141, an aperture information table 142, a discrepancy correction coefficient table 143, a discrepancy correction coefficient acquisition unit 145, an aperture information acquisition unit 144, an output level ratio acquisition unit 146, and a centroid gap calculation unit 147.

The light-reception sensitivity distribution information storage unit 141 is a unit that stores the light-reception sensitivity distribution information L. The aperture information table 142 is a table that stores the lens aperture information for each of the combinations of the imaging lenses and the F values. The discrepancy correction coefficient table 143 is a table that stores the discrepancy correction coefficient for each of the combinations of the imaging lenses and the F values.

The aperture information acquisition unit 144 is a unit that acquires the lens identification information received from the exchange lens unit 200 and acquires the lens aperture information D_k corresponding to a combination with an F value received from the imaging control unit 130 from the aperture information table 142. The aperture information acquisition unit 144 supplies the acquired lens aperture information D_k to the output level ratio acquisition unit 146.

The discrepancy correction coefficient acquisition unit 145 acquires the lens identification information received from the exchange lens unit 200 and acquires the discrepancy correction coefficient K_k corresponding to a combination with an F value from the imaging control unit 130 from the discrepancy correction coefficient table 143. The discrepancy correction coefficient acquisition unit 145 supplies the acquired discrepancy correction coefficient K_k to the focus detection unit 160.

The output level ratio acquisition unit 146 is a unit that calculates the output level ratio R which is a ratio of the output level of the pixel A to the output level of the pixel B. The output levels of the pixels A and B are not substantially the same in some cases due to a variation at the time of manufacturing, aging deterioration, or the like. In this case, however, a phase difference may not be detected accurately. Accordingly, based on the output level ratio R, the imaging apparatus 100 can accurately detect a phase difference by setting the output level of one (for example, the pixel A) of the pixels A and B as a reference value and correcting the output level of the other pixel such that the output level becomes equal to the reference value. The output level ratio acquisition unit 146 calculates the output level ratio R using, for example, Equation 8 to Equation 10 below. The output level ratio acquisition unit 146 supplies the calculated output level ratio R to the focus detection unit 160. Further, the output level ratio acquisition unit 146 calculates a light-reception amount distribution Z_k based on sum values of the light-reception sensitivity distributions and the lens aperture information calculated using Equation 8 and Equation 9, and then supplies the light-reception amount distribution Z_k to the centroid gap calculation unit 147

$$O_A = \sum_{\theta_x} \sum_{\theta_y} L_A(\theta_x, \theta_y) \cdot D(\theta_x, \theta_y) \quad \text{Equation 8}$$

$$O_B = \sum_{\theta_x} \sum_{\theta_y} L_B(\theta_x, \theta_y) \cdot D(\theta_x, \theta_y) \quad \text{Equation 9}$$

$$R = \frac{O_A}{O_B} \quad \text{Equation 10}$$

In Equation 8, $O_A$ indicates a sum value of the output levels of the pixel A. In Equation 9, $O_B$ indicates a sum value of the output levels of the pixel B. Further, the output level ratio R may be a ratio between statistical amounts of the output levels of the respective pixels and is not limited to the ratio between the sum values. For example, the output level ratio R may be a ratio between average values of the output levels of the pixels A and B.

The centroid gap calculation unit 147 is a unit that calculates the centroid gap G_k based on the light-reception amount distribution Z_k. The centroid gap calculation unit 147 calculates the centroid gap G_k using, for example, Equation 3 to Equation 5 and supplies the centroid gap G_k to the focus detection unit 160.

Further, the centroid gap calculated by the centroid gap calculation unit 122 of the discrepancy correction coefficient generation unit 120 is recalculated by the centroid gap calculation unit 147 of the focus detection preprocessing unit 140. This is because a memory capacity used to maintain the centroid gap is reduced. A centroid gap table that stores the centroid gaps calculated by the centroid gap calculation unit 122 for each imaging lens may be further provided, and the focus detection preprocessing unit 140 may be configured to read the centroid gap corresponding to the mounted imaging lens from the centroid gap table.

[Example of Configuration of Aperture Information Table]

FIG. 6 is a diagram illustrating an example of the aperture information table 142 according to the first embodiment. In the aperture information table 142, the lens aperture information D_k is registered for each of the combinations of the lens identification information and the F values. For example, lens aperture information "D_1" is registered in correspondence with a combination of the lens identification information "A" and the F value "1." Further, lens aperture information "D_2" is registered in correspondence with a combination of the lens identification information "A" and the F value "1.4."

[Example of Configuration of Discrepancy Correction Coefficient Table]

FIG. 7 is a diagram illustrating an example of the discrepancy correction coefficient table 143 according to the first embodiment. In the discrepancy correction coefficient table 143, the discrepancy correction coefficient K_k is registered for each of the combinations of the lens identification information and the F values. For example, a discrepancy correction coefficient "K_1" is registered in correspondence with a combination of the lens identification information "A" and the F value "1." Further, a discrepancy correction coefficient "K_2" is registered in correspondence with a combination of the lens identification information "A" and the F value "1.4." However, when the F value is sufficiently small in each imaging lens, it is not necessary to perform the correction. Therefore, "1" is registered as a value of the discrepancy correction coefficient.

[Example of Configuration of Focus Detection Unit]

Figure 8:
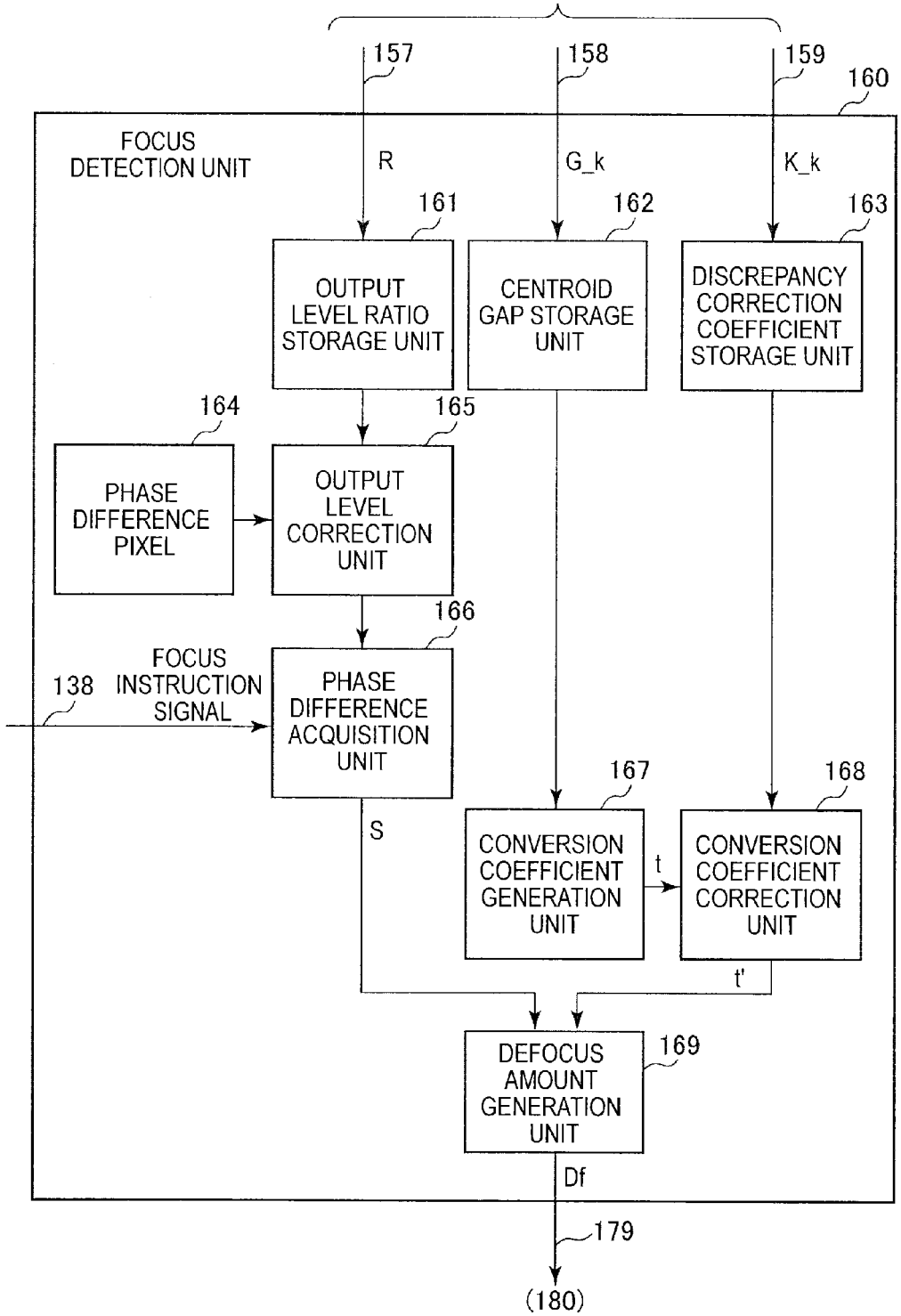
FIG. 8 is a block diagram illustrating an example of the configuration of a focus detection unit according to the first embodiment.

FIG. 8 is a block diagram illustrating an example of the configuration of the focus detection unit 160 according to the first embodiment. The focus detection unit 160 includes an output level ratio storage unit 161, a centroid gap storage unit 162, a discrepancy correction coefficient storage unit 163, phase difference pixels 164, an output level correction unit 165, and a phase difference acquisition unit 166. The focus detection unit 160 further includes a conversion coefficient generation unit 167, a conversion coefficient correction unit 168, and a defocus amount generation unit 169.

The output level ratio storage unit 161 is a unit that stores the output level ratio R received from the focus detection preprocessing unit 140. The centroid gap storage unit 162 is a unit that stores the centroid gap G_k received from the focus detection preprocessing unit 140. The discrepancy correction coefficient storage unit 163 is a unit that stores the discrepancy correction coefficient K_k received from the focus detection preprocessing unit 140.

The phase difference pixels 164 are pixels that include the pixels A and B and are used to detect a phase difference. The phase difference pixel 164 supplies an output level corresponding to an amount of received light of each of the pixels A and B to the output level correction unit 165. The imaging apparatus 100 is configured to detect a phase difference from the phase difference pixels 164 disposed on the imaging element, but may be configured to detect a phase difference from a dedicated AF module disposed outside the imaging element. Further, the imaging apparatus 100 may be configured to include both the phase difference pixel 164 and the dedicated AF module and detect a phase difference using the phase difference pixel and the dedicated AF module.

The output level correction unit 165 is a unit that corrects the output level of one (for example, the B pixel) of the pixels A and B based on the output level ratio R. Specifically, the output level correction unit 165 performs the correction by multiplying the output level of the pixel B by the output level ratio R. The output level correction unit 165 supplies the light-reception amount distribution Z_k according to the corrected output levels of the pixels A and B to the phase difference acquisition unit 166.

The phase difference acquisition unit 166 calculates the phase difference based on the light-reception amount distributions of the pixels A and B. The phase difference acquisition unit 166 calculates a phase difference S based on an amount of shift with the highest degree of correlation using Equation 6. The phase difference acquisition unit 166 supplies the calculated phase difference S to the defocus amount generation unit 169.

The conversion coefficient generation unit 167 is a unit that generates a conversion coefficient t based on the centroid gap G_k. For example, the conversion coefficient generation unit 167 calculates the reciprocal of the centroid gap G_k as the conversion coefficient t and supplies the reciprocal of the centroid gap G_k to the conversion coefficient correction unit 168.

The conversion coefficient correction unit 168 is a unit that corrects the conversion coefficient t using the discrepancy correction coefficient K_k. For example, the conversion coefficient correction unit 168 calculates a value obtained by multiplying the conversion coefficient t by the discrepancy correction coefficient K_k as a corrected conversion coefficient t', and supplies the conversion coefficient t' to the defocus amount generation unit 169.

The defocus amount generation unit 169 is a unit that generates the amount of defocus Df based on the phase difference S and the conversion coefficient t'. The defocus amount generation unit 169 calculates the amount of defocus Df based on the phase difference S and the conversion coefficient t' using Equation 11 and Equation 12 below, and then supplies the amount of defocus Df to the focusing unit 180.

$$D'_f = t' \times S \quad \text{Equation 11}$$
$$= t \times K\_k \times S$$
$$= \frac{1}{G} \times K\_k \times S$$

$$D'_f = D_f + s \quad \text{Equation 12}$$

In Equation 12, s is a value obtained by converting a distance between the pixels A and B into a distance in the defocus direction.

Further, the focus detection unit 160 is configured to correct the output level of the phase difference pixel. However, when the degree of discrepancy between the output levels is considered to be sufficiently small, it is not necessary to correct the output level. In this case, the focus detection unit 160 does not include the output level ratio storage unit 161 and the output level correction unit 165, and the output level of the phase difference pixel is supplied to the phase difference acquisition unit 166.

[Example of Process of Imaging Apparatus]

Figure 9:
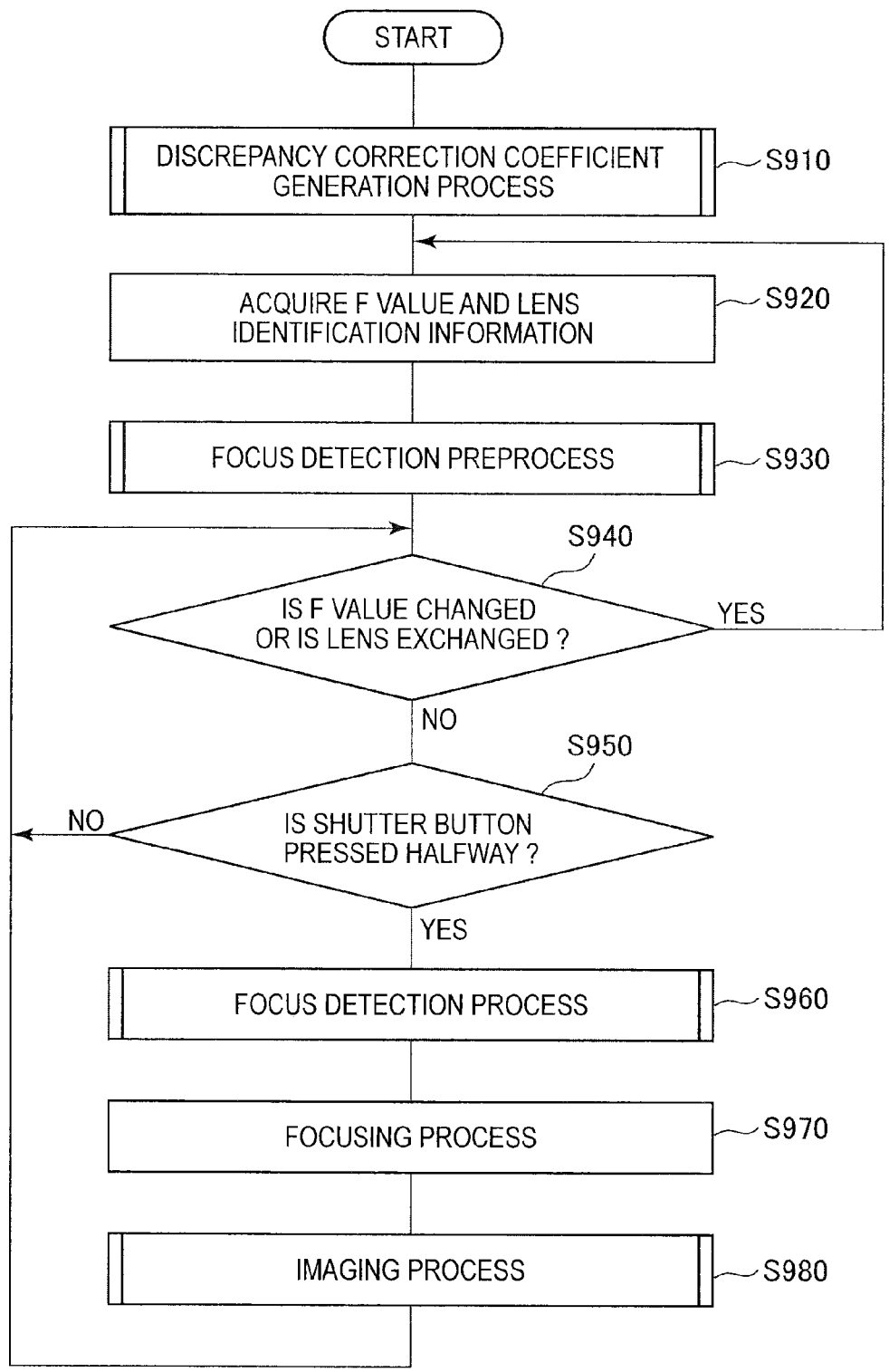
FIG. 9 is a flowchart illustrating an example of a process of the imaging apparatus according to the first embodiment.

FIG. 9 is a flowchart illustrating an example of a process of the imaging apparatus 100 according to the first embodiment. The process starts, for example, when the light-reception sensitivity distribution information L and the lens aperture information D__1 to D_n are input to the imaging apparatus 100.

The imaging apparatus 100 performs a discrepancy correction coefficient generation process to generate the discrepancy correction coefficients K__1 to K_n (step S910). Then, the imaging apparatus 100 acquires a current F value and the lens identification information regarding a mounted imaging lens (step S920). After the imaging apparatus 100 acquires the F value and the lens identification information regarding the imaging lens, the imaging apparatus 100 performs a focus detection preprocess to calculate the output level ratio R, the centroid gap G_k, and the discrepancy correction coefficient K_k (step S930).

The imaging apparatus 100 determines whether the F value is changed or the imaging lens is exchanged (step S940). When the F value is changed or the imaging lens is exchanged (Yes in step S940), the imaging apparatus 100 causes the process to return to step S920.

Conversely, when the F value is not changed or the imaging lens is not exchanged (No in step S940), the imaging apparatus 100 determines whether the shutter button is pressed halfway (step S950). When the shutter button is pressed halfway (Yes in step S950), the imaging apparatus 100 performs a focus detection process to generate the amount of defocus (step S960). Then, the imaging apparatus 100 performs a focusing process to control the position of the focusing lens according to the amount of defocus (step S970). Further, the imaging apparatus 100 performs an imaging process to capture an image (step S980).

When the shutter button is not pressed halfway (No in step S950) or after step S980 is performed, the imaging apparatus 100 causes the process to return to step S940.

Figure 10:
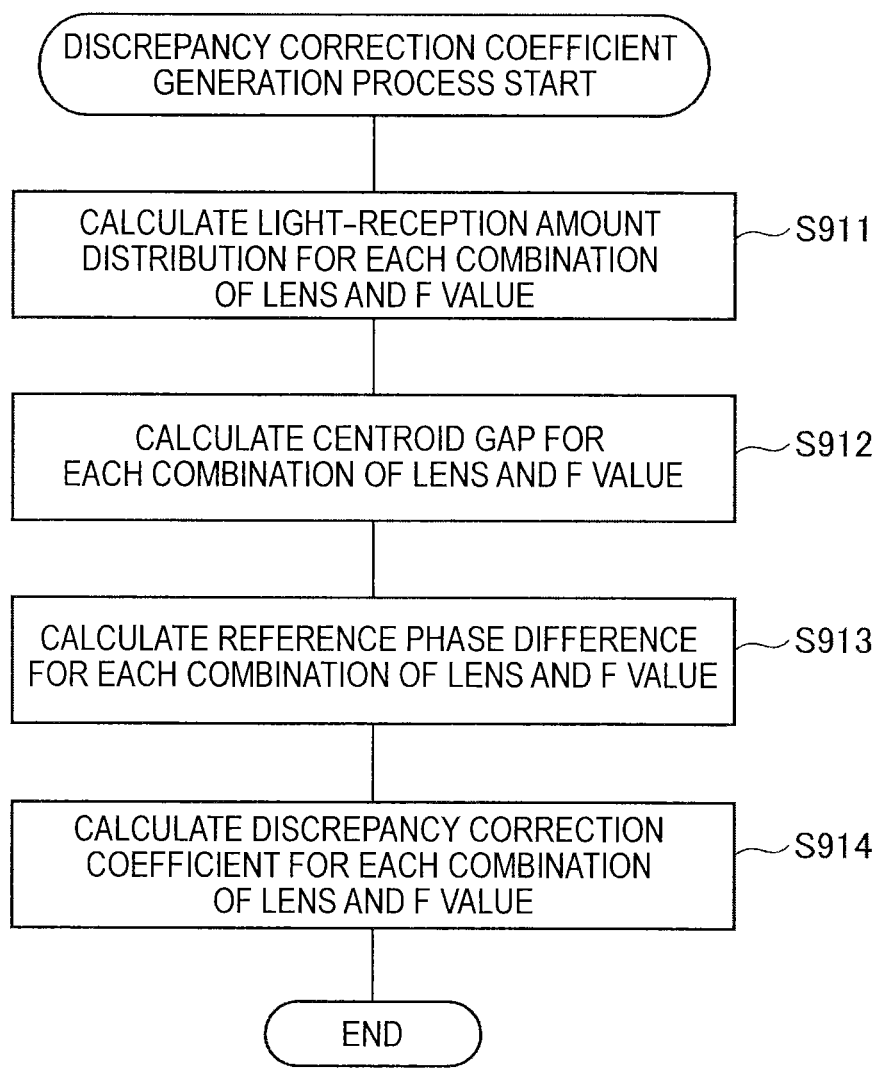
FIG. 10 is a flowchart illustrating an example of a discrepancy correction coefficient generation process according to the first embodiment.

FIG. 10 is a flowchart illustrating an example of the discrepancy correction coefficient generation process according to the first embodiment. The discrepancy correction coefficient generation unit 120 of the imaging apparatus 100 calculates the light-reception amount distribution for each of the combinations of the imaging lens and the F values based on the light-reception sensitivity distribution information L and the lens aperture information D__1 to D_n (step S911).

The discrepancy correction coefficient generation unit 120 calculates the centroid gap for each of the combinations of the imaging lenses and the F values based on the light-reception amount distributions Z__1 to Z_n (step S912). Then, the discrepancy correction coefficient generation unit 120 calculates the reference phase difference for each of the combinations of the imaging lenses and the F values based on the light-reception amount distributions Z__1 to Z_n (step S913). The discrepancy correction coefficient generation unit 120 calculates the discrepancy correction coefficient for each of the combinations of the imaging lenses and the F values based on the centroid gaps G__1 to G_n and the reference phase differences $S_0\_1$ to $S_0\_n$ (step S914). After step S914, the discrepancy correction coefficient generation unit 120 ends the discrepancy correction coefficient generation process.

Figure 11:
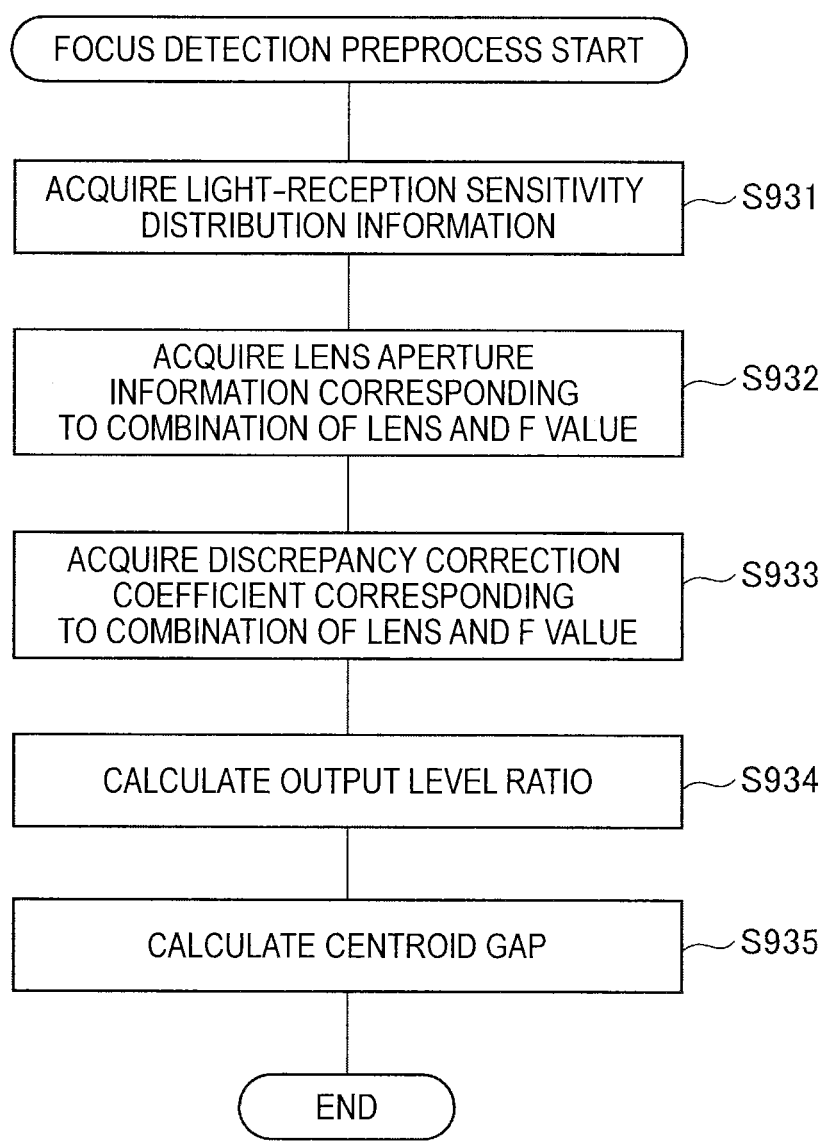
FIG. 11 is a flowchart illustrating an example of a focus detection preprocess according to the first embodiment.

FIG. 11 is a flowchart illustrating an example of the focus detection preprocess according to the first embodiment. The focus detection preprocessing unit 140 of the imaging apparatus 100 acquires the light-reception sensitivity distribution information L from the light-reception sensitivity distribution information storage unit 141 (step S931).

The focus detection preprocessing unit 140 acquires the lens aperture information D_k corresponding to the combination of the imaging lens and the F value from the aperture information table 142 (step S932). Then, the focus detection preprocessing unit 140 acquires the discrepancy correction coefficient K_k corresponding to the combination of the imaging lens and the F value from the discrepancy correction coefficient table 143 (step S933).

The focus detection preprocessing unit 140 calculates the output level ratio R based on the light-reception sensitivity distribution information L and the lens aperture information D_k (step S934). Then, the focus detection preprocessing unit 140 calculates the centroid gap G_k based on the light-reception amount distribution Z_k (step S935). After step S935, the focus detection preprocessing unit 140 ends the focus detection preprocess.

Figure 12:
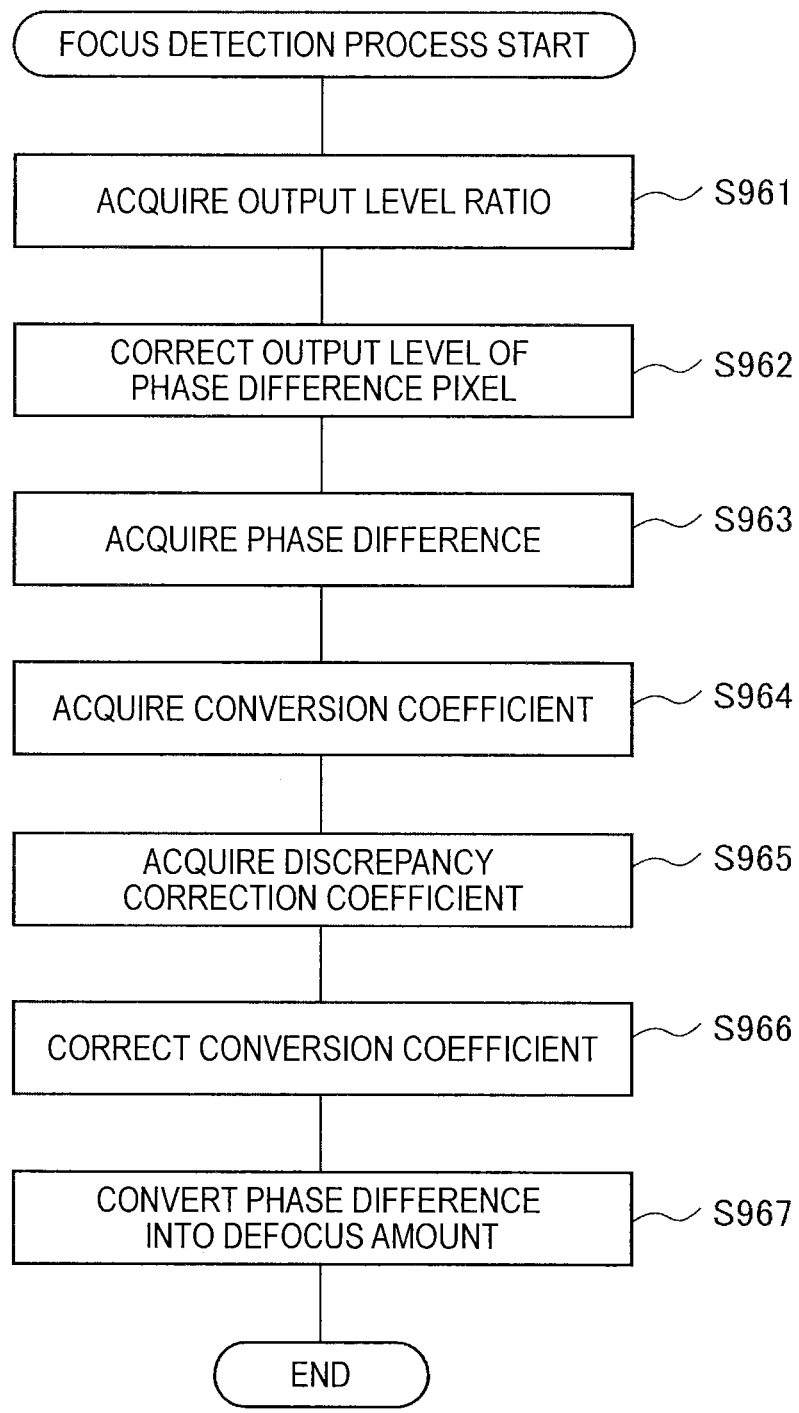
FIG. 12 is a flowchart illustrating an example of a focus detection process according to the first embodiment.

FIG. 12 is a flowchart illustrating an example of the focus detection process according to the first embodiment. The focus detection unit 160 of the imaging apparatus 100 acquires the output level ratio R from the output level ratio storage unit 161 (step S961). The focus detection unit 160 corrects the output level of the phase difference pixel based on the acquired output level ratio R (step S962). The focus detection unit 160 acquires the phase difference S based on the corrected output level (step S963).

The focus detection unit 160 reads the centroid gap G_k from the centroid gap storage unit 162 and acquires the conversion coefficient t which is the reciprocal of the centroid gap G_k (step S964). Then, the focus detection unit 160 acquires the discrepancy correction coefficient K_k from the discrepancy correction coefficient storage unit 163 (step S965). The focus detection unit 160 corrects the conversion coefficient t by multiplying the discrepancy correction coefficient K_k (step S966). The focus detection unit 160 converts the phase difference S into the amount of defocus DF based on the corrected conversion coefficient t' (step S967). After step S967, the focus detection unit 160 ends the focus detection process.

Figure 13:
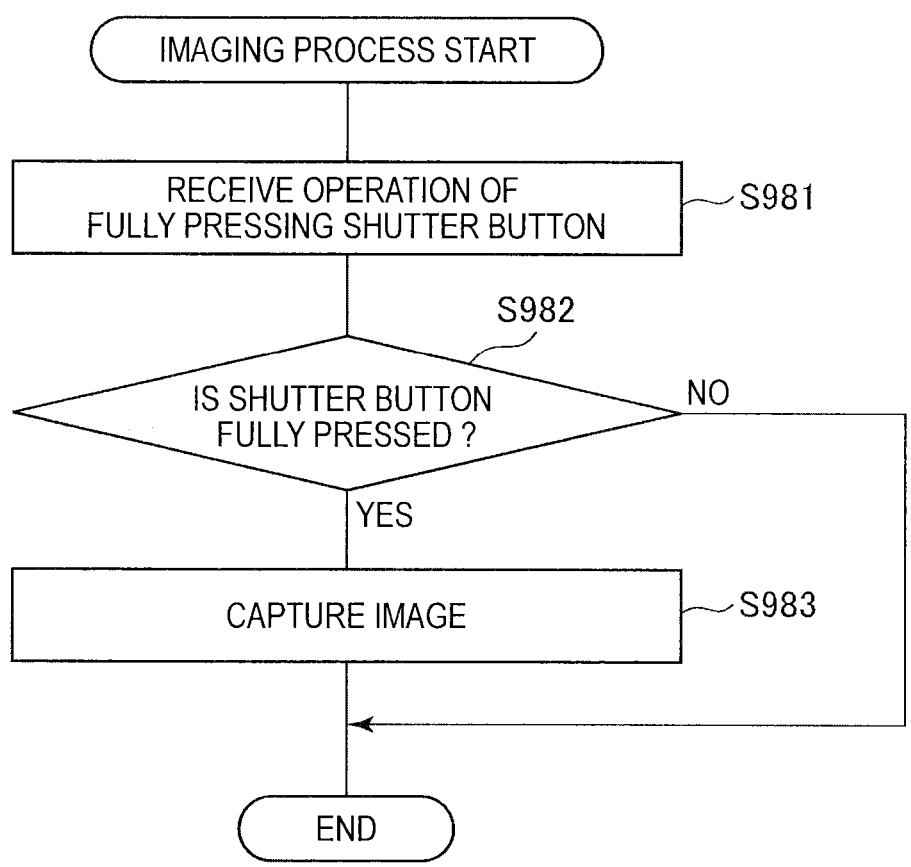
FIG. 13 is a flowchart illustrating an example of an imaging process according to the first embodiment.

FIG. 13 is a flowchart illustrating examples of the imaging process according to the first embodiment. The imaging unit 190 of the imaging apparatus 100 starts receiving an operation of fully pressing the shutter button (step S981). The imaging unit 190 determines whether the shutter button is fully pressed (step S982). When the shutter button is fully pressed (Yes in step S982), the imaging unit 190 captures an image (step S983). When the shutter button is not fully pressed (No step S982) or after step S983 is performed, the imaging unit 190 ends the imaging process.

Figure 14:
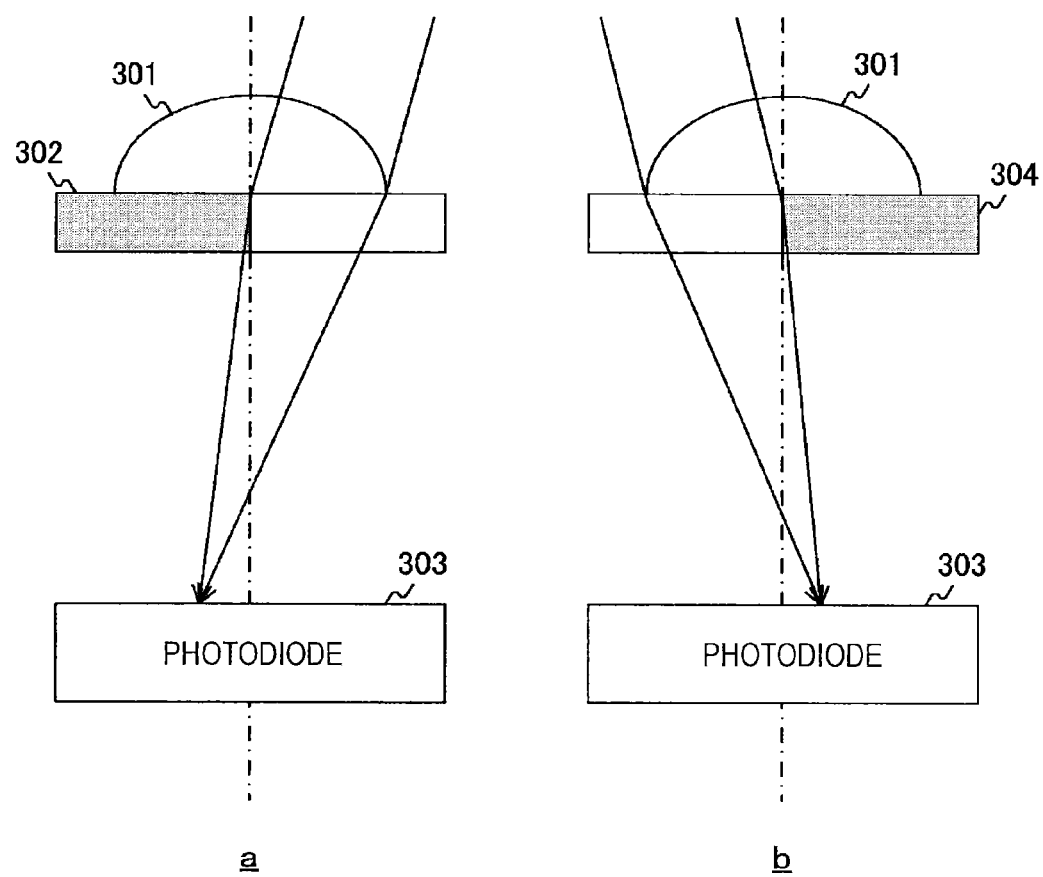
FIGS. 14a and 14b are side views illustrating an example of a phase difference pixel according to the first embodiment.

FIGS. 14a and 14b are side views illustrating an example of the phase difference pixel 164 according to the first embodiment. FIG. 14a is the side view illustrating the pixel A among the phase difference pixels 164. FIG. 14b is the side view illustrating the pixel B. In FIGS. 14a and 14b, each arrow indicates a direction in which light is incident. Each of the pixels A and B includes a microlens 301 and a photodiode 303. Further, the pixel A includes a metal 302 and the pixel B includes a metal 304.

The microlens 301 is a lens that condenses light from the imaging lens to the photodiode 303. The photodiode 303 is an element that converts the received light into an electric signal with a level according to the amount of received light. Each of the metals 302 and 304 is a member that includes an opening portion in a part thereof. The center of the opening portion of the metal 302 in the pixel A is eccentric from the center of the microlens 301 in a given direction (for example, a +x direction). On the other hand, the center of the opening portion of the metal 304 in the pixel B is eccentric from the center of the microlens 301 in an opposite direction (for example, a −x direction) to the direction of the pixel A.

A pupil in the imaging lens is divided by the opening portions of the metals 302 and 304, and thus light is incident at symmetric angles to the pixels A and B. As a result, the light-reception amount distributions of the pixels A and B are deviated from each other in position. The amount of deviation between the light-reception amount distributions becomes a value according to an amount of focus deviation in the optical axis direction. Therefore, the amount of focus deviation in the optical axis direction is calculated by detecting the amount of deviation between the light-reception amount distributions as the phase difference.

FIGS. 15a and 15b are diagrams illustrating examples of a light-reception sensitivity distribution of the phase difference pixel according to the first embodiment. In FIGS. 15a and 15b, the vertical axis represents the incident angle θy in the y axis direction and the horizontal axis represents the incident angle θx in the x axis direction. With regard to colors of color-coded elliptical regions, the darker the color is, the higher the light-reception sensitivity is. FIG. 15a illustrates an example of a light-reception sensitivity distribution 402 of the pixel B and FIG. 15b illustrates an example of a light-reception sensitivity distribution 401 of the pixel A. The center of the light-reception sensitivity distribution 402 of the pixel B is disposed at a position biased from the origin in a given direction (for example, the +θx direction). The center of the light-reception sensitivity distribution 401 of the pixel A is disposed at a position biased in the opposite direction (for example, the −θx direction) to the direction of the pixel B. This is because the positions of the opening portions of the pixels A and B are different from each other, as exemplified in FIGS. 14a and 14b, and thus the incident angles of the received light are different from each other.

FIGS. 16a and 16b are diagrams illustrating examples of a pupil of an imaging lens according to the first embodiment. In FIGS. 16a and 16b, the vertical axis represents the incident angle θy in the y axis direction and the horizontal axis represents the incident angle θx in the x axis direction. FIG. 16a illustrates an example of the shape of a pupil of an imaging lens when viewed from a phase difference pixel at a position close to the optical axis. FIG. 16b illustrates the shape of the pupil of the imaging lens when viewed from a phase difference pixel at a position distant from the optical axis. As the phase difference pixel is closer to the optical axis, the pupil is closer to an exact circle. On the other hand, as the phase difference pixel is more distant from the optical axis, a phenomenon in which the pupil partially dilates due to the lens frame, that is, a so-called vignette, may occur and the shape of the pupil becomes elliptical.

FIGS. 17a and 17b are diagrams illustrating light-reception sensitivity distributions and pupils when an F value is small according to the first embodiment. In FIGS. 17a and 17b, the vertical axis represents the incident angle θy in the y axis direction and the horizontal axis represents the incident angle θx in the x axis direction. FIG. 17a is the diagram illustrating a pupil 501 when a light-reception sensitivity distribution 401 of the pixel A and an F value are small. FIG. 17b is the diagram illustrating a pupil 502 when a light-reception sensitivity distribution 402 of the pixel B and an F value are small. As the F value is smaller, in other words, as a stop is further opened, the area of the pupil is larger. Therefore, in an ideal condition in which the F value is sufficiently small, an overlapping area of a pupil and a light-reception sensitivity distribution is sufficiently large.

FIGS. 18a and 18b are diagrams illustrating examples of light-reception amount distributions of the phase difference pixels when an F value is small according to the first embodiment. In FIGS. 18a and 18b, the vertical axis represents an output level according to an amount of received light of the pixel A or B and the horizontal axis represents the incident angle θx in the x axis direction. FIG. 18a illustrates an example of a light-reception amount distribution 601 of the pixel A and FIG. 18b illustrates an example of a light-reception amount distribution 611 of the pixel B. As exemplified in FIGS. 17a and 17b, an overlapping area of a pupil and a light-reception sensitivity distribution is sufficiently large in the ideal condition in which an F value is sufficiently small. Therefore, the output levels of the pixels A and B approach designed values. As a result, the shapes of the light-reception amount distributions of the pixels A and B are substantially the same.

FIGS. 19a and 19b are diagrams illustrating a method of calculating a phase difference when an F value is small according to the first embodiment. In FIGS. 19a and 19b, the vertical axis represents an output level Z according to an amount of received light of the pixel A or B and the horizontal axis represents the incident angle θx in the x axis direction. FIG. 19a illustrates an example of a light-reception amount distribution shifted by various amounts of shift. A solid line indicates the light-reception amount distribution before the shift and a dotted line indicates the light-reception amount distribution after the shift. FIG. 19b is a diagram illustrating an example of a relation between a correlation calculation result C and an amount of shift θs. When the light-reception amount distribution 601 of the pixel A is fixed and the light-reception amount distribution 611 of the pixel B is shifted gradually in the +θx direction, as illustrated in FIG. 19a, the degree of correlation between the light-reception amount distributions of the pixels A and B is highest in a given amount of shift θm, as illustrated in FIG. 19b. The amount of shift θm is detected as a phase angle difference. Further, the imaging apparatus 100 may calculate an amount of shift in which the degree of correlation is highest by fixing the light-reception amount distribution of the pixel B and shifting the light-reception amount distribution of the pixel A.

Figure 20:
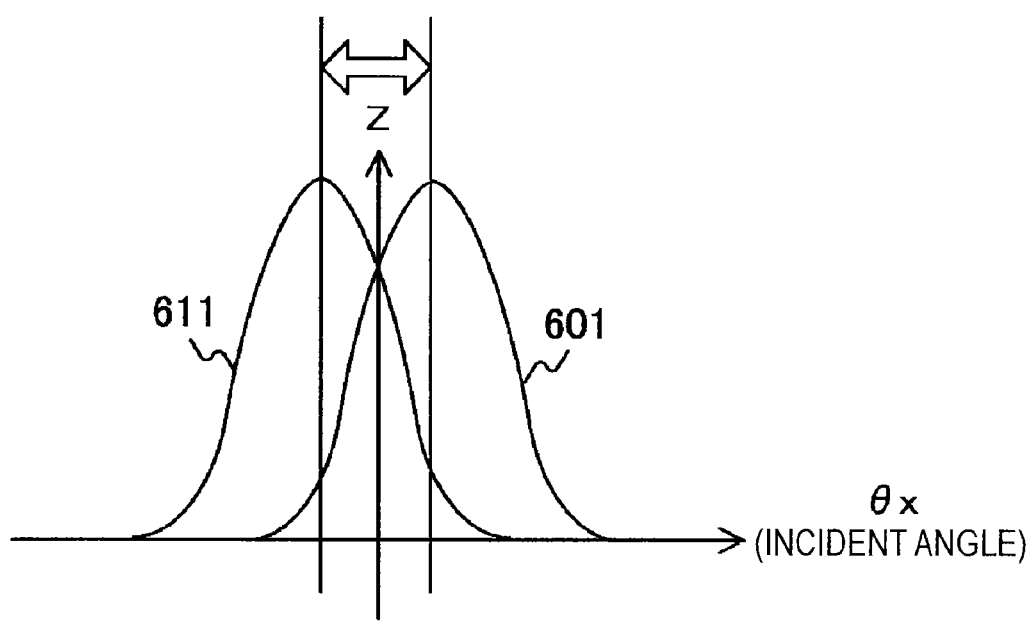
FIG. 20 is a diagram illustrating an example of a relation between a reference phase difference and a centroid gap when an F value is small according to the first embodiment.

FIG. 20 is a diagram illustrating an example of a relation between a reference phase difference and a centroid gap when an F value is small according to the first embodiment. When the F value is sufficiently small, the shapes of the light-reception amount distributions of the pixels A and B are substantially the same. In this case, the centroid gap G and a value of the reference phase difference Si corresponding to the reference amount of defocus Df0 are substantially the same.

FIGS. 21a and 21b are diagrams illustrating light-reception sensitivity distributions and pupils when an F value is large according to the first embodiment. In FIGS. 21a and 21b, the vertical axis represents the incident angle θy in the y axis direction and the horizontal axis represents the incident angle θx in the x axis direction. FIG. 21a is a diagram illustrating the light-reception sensitivity distribution 401 of the pixel A and a pupil 511 when the F value is small. FIG. 21b is a diagram illustrating the light-reception sensitivity distribution 402 of the pixel B and a pupil 512 when the F value is small. The larger the F value is, in other words, the narrower the stop is, the smaller the area of the pupil is. Therefore, when the F value is relatively large, the overlapping area of the pupil and the light-reception sensitivity distribution is relatively small. In particular, as the position of the pixel A or B is more distant from the optical axis, the overlapping area is smaller.

FIGS. 22a and 22b are diagrams illustrating examples of light-reception amount distributions of the phase difference pixels when an F value is large according to the first embodiment. In FIGS. 22a and 22b, the vertical axis represents an output level Z according to an amount of received light of the pixel A or B and the horizontal axis represents the incident angle θx in the x axis direction. FIG. 22a illustrates an example of a light-reception amount distribution 621 of the pixel A and FIG. 22b illustrates an example of a light-reception amount distribution 631 of the pixel B. As exemplified in FIGS. 22a and 22b, when the F value is relatively large, the overlapping area of the pupil and the light-reception sensitivity distribution is smaller as the position of the pixel A or B is more distant from the optical axis. Thus, the output level is smaller than a designed value. Therefore, the shapes of the light-reception amount distributions of the pixels A and B are not substantially the same.

Figure 23:
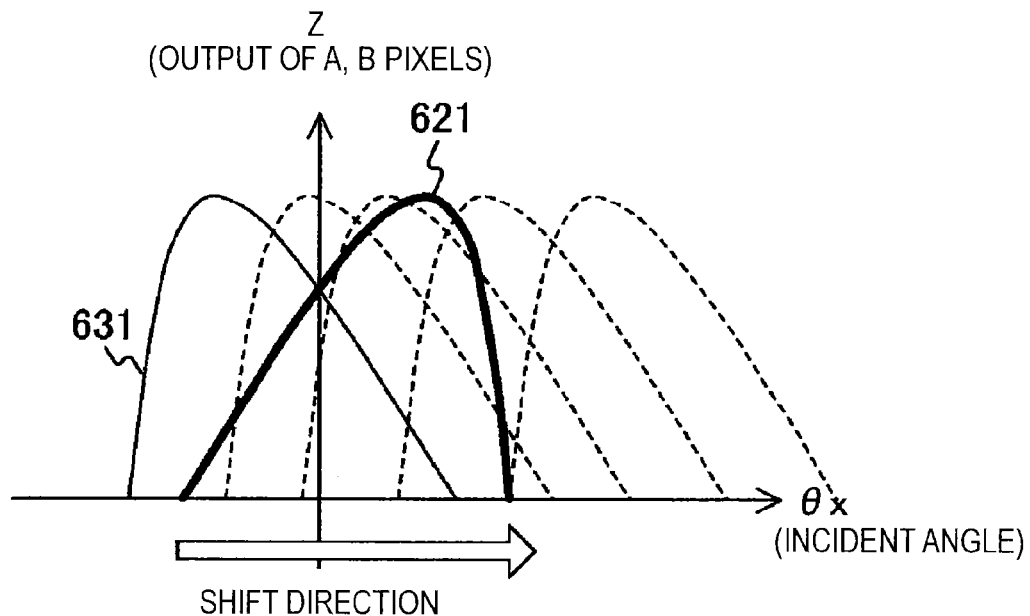
FIG. 23 is a diagram illustrating a method of calculating a phase difference when an F value is large according to the first embodiment.

FIG. 23 is a diagram illustrating a method of calculating a phase difference when an F value is large according to the first embodiment. In FIG. 23, the vertical axis represents an output level Z according to an amount of received light of the pixel A or B and the horizontal axis represents the incident angle θx in the x axis direction. When a light-reception amount distribution 621 of the pixel A is fixed and a light-reception amount distribution 631 of the pixel B is shifted gradually in the +θx direction, the degree of correlation between the light-reception amount distributions of the pixels A and B is the highest in a given amount of shift θm. The amount of shift θm is detected as a phase angle difference.

Figure 24:
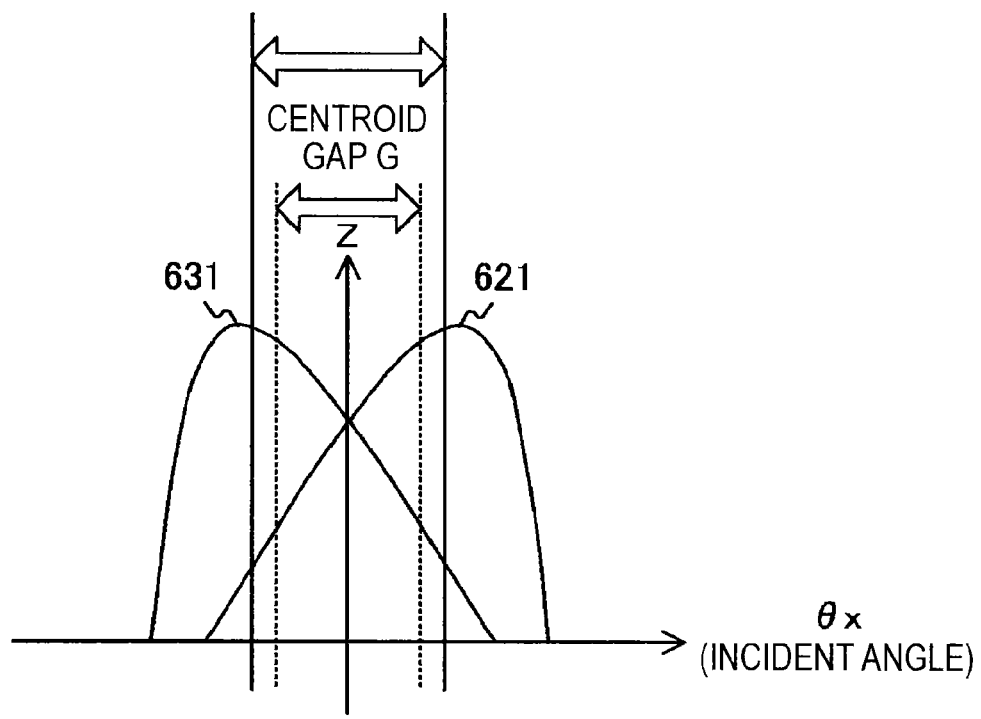
FIG. 24 is a diagram illustrating an example of a relation between the reference phase difference and the centroid gap when an F value is large according to the first embodiment.

FIG. 24 is a diagram illustrating an example of a relation between the reference phase difference and the centroid gap when an F value is large according to the first embodiment. When the F value is relatively small, the shapes of the light-reception amount distributions of the pixels A and B are not substantially the same. Therefore, the output levels of the pixels A and B may be different from designed values. As a result, a value of the reference phase difference S0 corresponding to the reference amount of defocus Df0 is different from the centroid gap G.

Figure 25:
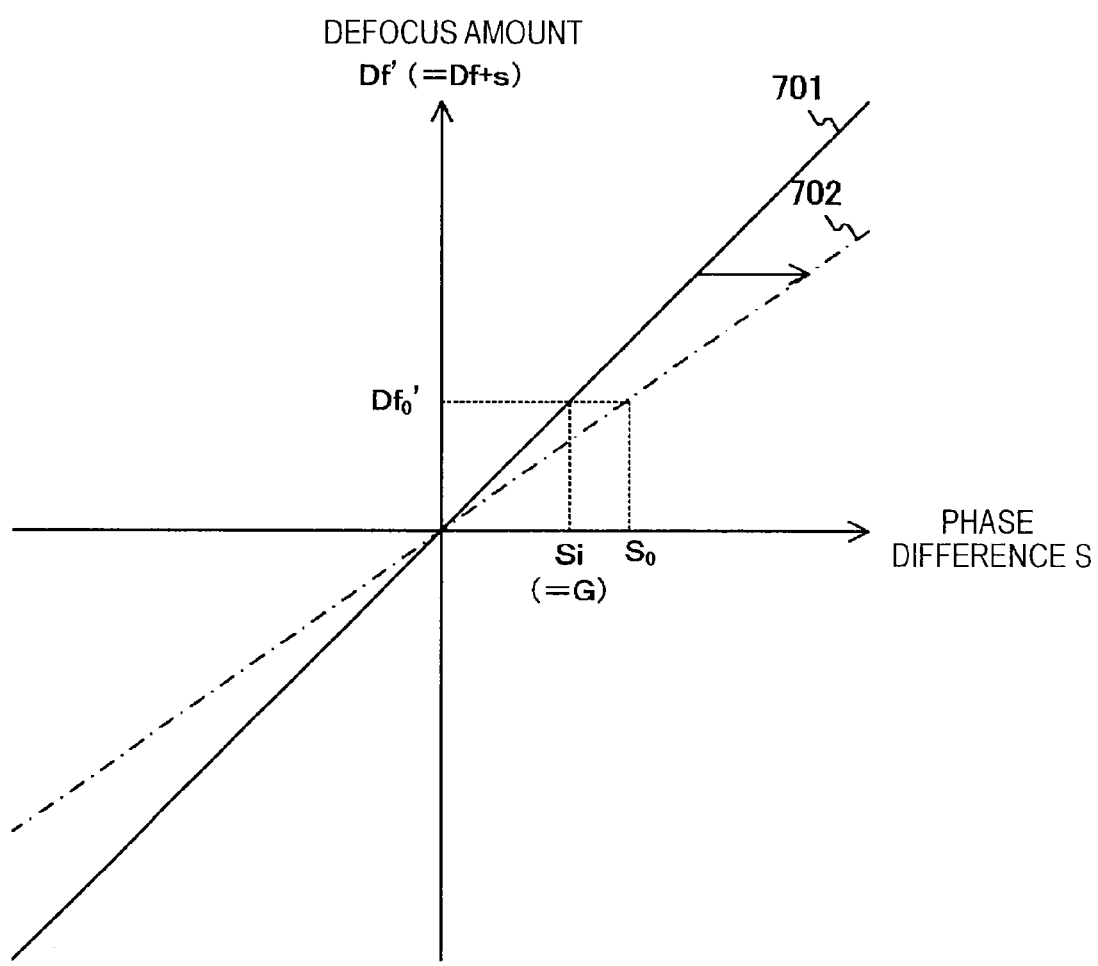
FIG. 25 is a diagram illustrating an example of a relation between a phase difference and an amount of defocus according to the first embodiment.

FIG. 25 is a diagram illustrating an example of a relation between a phase difference S and an amount of defocus Df according to the first embodiment. In FIG. 25, the vertical axis represents the amount of defocus Df and the horizontal axis represents the phase difference S. A solid line 701 is a straight line that indicates the relation between the phase difference S and the amount of defocus Df under the ideal condition in which the shapes of the light-reception amount distributions of the pixels A and B are substantially the same since the F value is sufficiently small. In this case, a ratio of the phase difference S to the amount of defocus Df, that is, a slope of the straight line, corresponds to the conversion coefficient t.

On the other hand, a one-dot chain line 702 is a straight line that indicates a relation between the phase difference S and the amount of defocus Df when the shapes of the light-reception amount distributions of the pixels A and B are not substantially the same due to the fact that the F value is relatively large. In this case, the ratio of the phase difference S to the amount of defocus Df may be different from the conversion coefficient t assumed under the ideal condition. Therefore, when the amount of defocus Df is calculated from the phase difference S by using the conversion coefficient t without correction, an exact value may not be obtained.

As described above, the reference phase difference Si corresponding to a reference amount of defocus Df0' is equal to the centroid gap G on the solid line 701. As described above, when the imaging lens is the same, the centroid gap G is a constant value irrespective of the F value. Accordingly, even on the one-dot chain line 702 in which the F value is relatively large, the centroid gap G is equal to the value of the centroid gap on the solid line 701. The ratio of the reference phase difference S0 corresponding to the reference amount of defocus Df0' to the centroid gap G, that is, the reference phase difference Si, on the one-dot chain line 702 is the same as a ratio of the slope of the one-dot chain line 702 to the slope of the solid line 701. Therefore, the amount of defocus Df can be calculated accurately by using the ratio of the reference phase difference S0 to the centroid gap G as the correction coefficient K and correcting the conversion coefficient t.

Thus, according to the first embodiment, the imaging apparatus 100 can accurately calculate the amount of defocus by correcting the conversion coefficient according to the degree of discrepancy between the shapes of a pair of light-reception amount distributions. Accordingly, an accurately focused image is captured.

Figure 26:
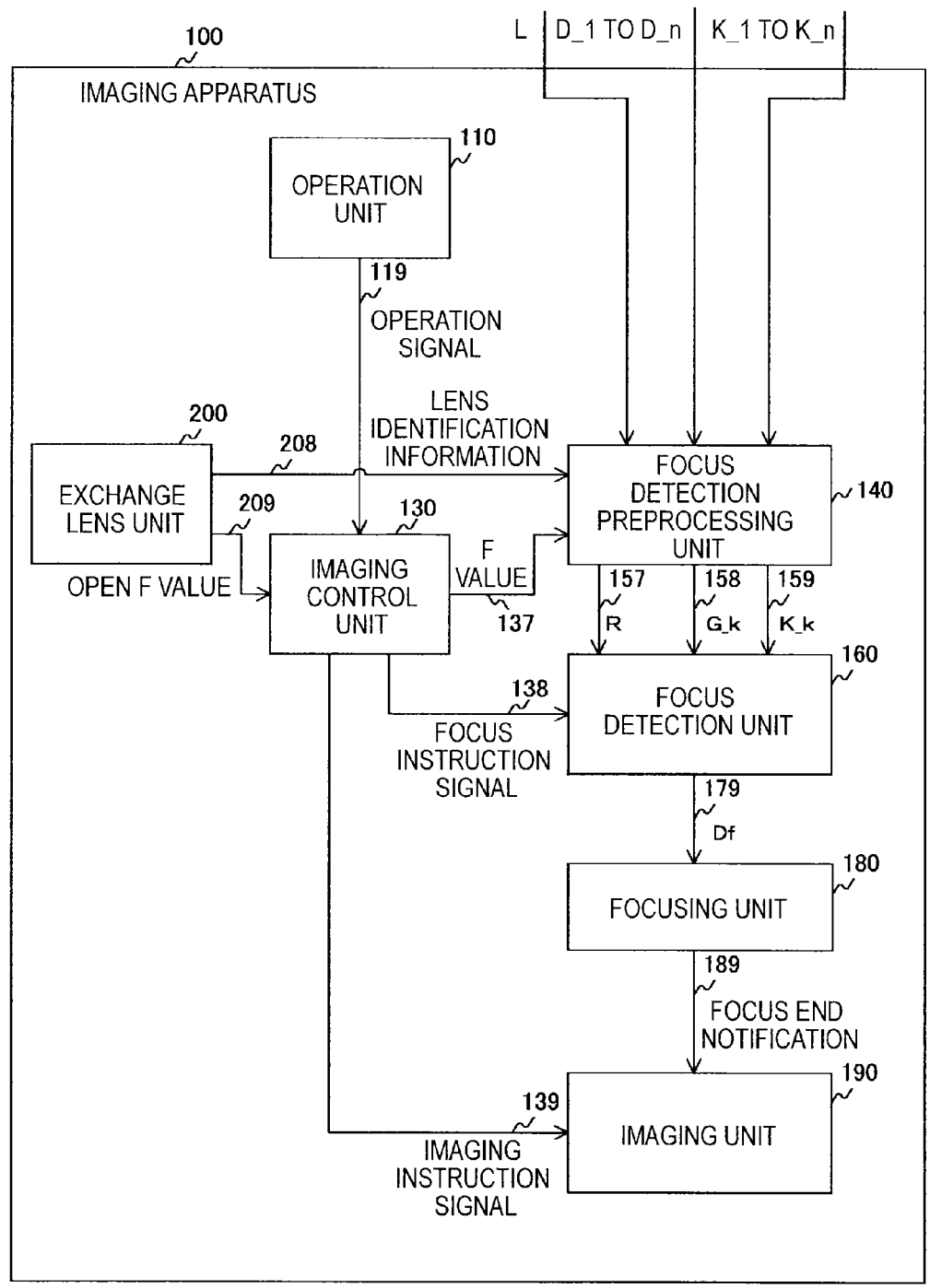
FIG. 26 is a block diagram illustrating an example of the configuration of an imaging apparatus according to a modification example of the first embodiment.

Further, the imaging apparatus 100 is configured to generate the discrepancy correction coefficient. However, the imaging apparatus 100 may be configured to acquire a discrepancy correction coefficient generated outside the imaging apparatus 100. In this case, as illustrated in FIG. 26, the imaging apparatus 100 does not include the discrepancy correction coefficient generation unit 120, and a discrepancy correction coefficient generated in advance is input to the focus detection preprocessing unit 140.

Figure 27:
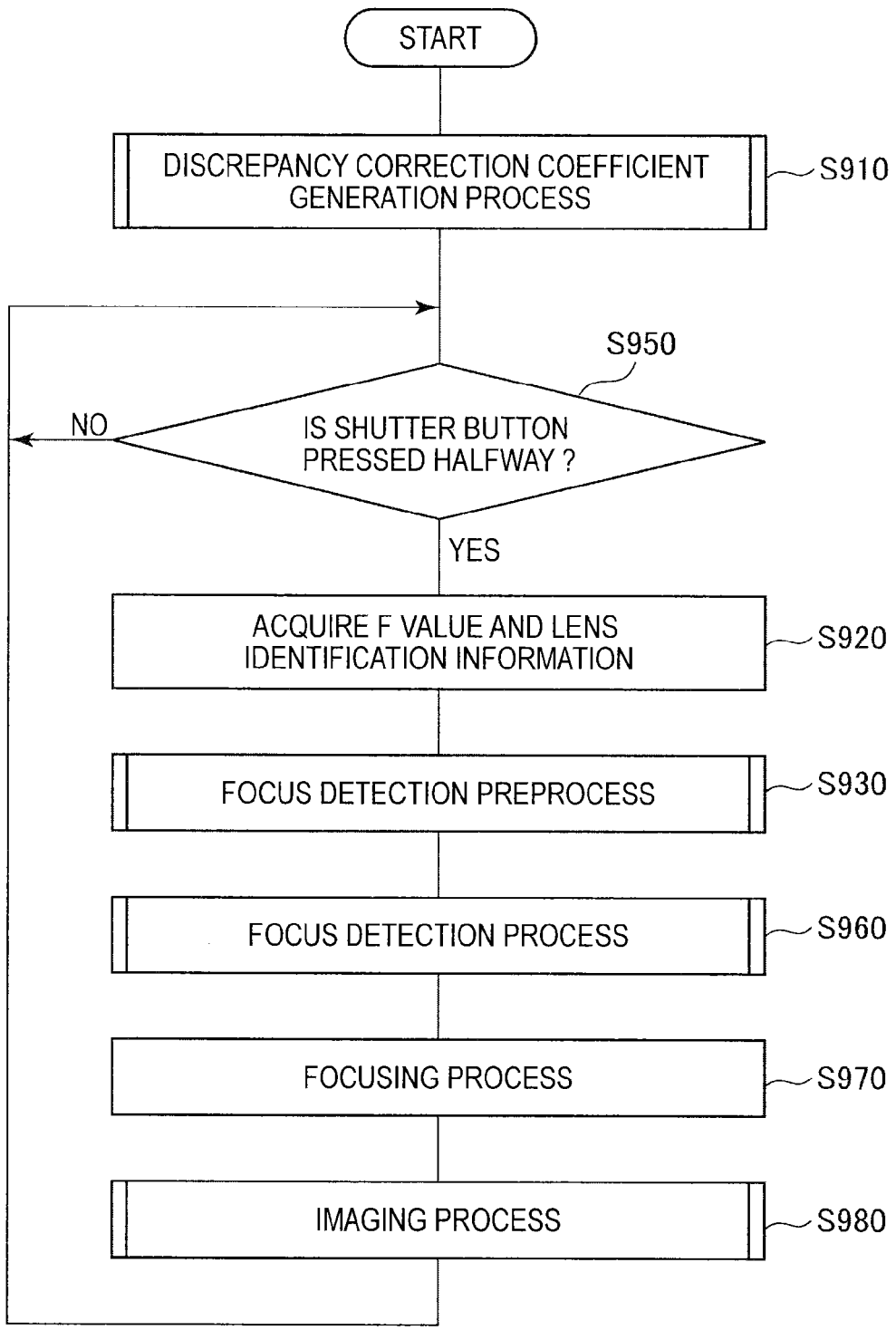
FIG. 27 is a diagram illustrating an example of a process of the imaging apparatus according to a modification example of the first embodiment.

The imaging apparatus 100 is configured to perform the focus detection preprocess before the instruction to start the focus detection is given. However, the focus detection preprocess may be configured to be performed after the instruction to start the focus detection is given. In this case, as illustrated in FIG. 27, the imaging apparatus 100 acquires an F value and lens identification information (step S920), after the shutter button is pressed halfway (Yes in step S950). Then, the imaging apparatus 100 performs a focus detection preprocess (step S930), a focus detection process (step S960), a focusing process (step S970), and an imaging process (step S980), and then the process returns to step S950.

2. Second Embodiment

Example of Configuration of Aperture Information Table

FIG. 28 is a diagram illustrating an example of an aperture information table 142 according to a second embodiment. For example, the aperture information table 142 stores the lens aperture information for each of the combinations of lens identification information, F values, focal distances, points of focus, and image heights. In an imaging apparatus in which an imaging lens is not exchanged, it is not necessary to store the discrepancy correction coefficient for each imaging lens.

In the first embodiment, the imaging apparatus generated the discrepancy correction coefficient for each of the combinations of the imaging lenses and the F values. However, since the ratio of the phase difference to the amount of defocus is also changed by other optical parameters than the F values in an optical system, the discrepancy correction coefficient is preferably generated for each of the combinations of the imaging lenses and various optical parameters including parameters other than the F values. An imaging apparatus 100 of the second embodiment is different from that of the first embodiment in that the discrepancy correction coefficient is generated for each of the combinations of the imaging lenses and values of various optical parameters.

Examples of the optical parameters changing the ratio of the phase difference to the amount of defocus include a point of focus which is a point at which focus is achieved in a depth direction and an image height in addition to the F value. The image height is a height of an image in a direction perpendicular to an optical axis when the optical axis is assumed to be the origin in an image formed on an imaging element.

The imaging apparatus 100 according to the second embodiment generates the discrepancy correction coefficient for each of the combinations of the various optical parameters based on the lens identification information and the lens aperture information for each of these combinations, and stores the discrepancy correction coefficient in a discrepancy correction coefficient table 143.

FIG. 29 is a diagram illustrating an example of a discrepancy correction coefficient table 143 according to the second embodiment. For example, the discrepancy correction coefficient table 143 stores the discrepancy correction coefficient for each of the combinations of lens identification information, F values, focal distances, points of focus, and image heights.

The imaging apparatus 100 according to the second embodiment reads the lens identification information regarding a mounted imaging lens and a discrepancy correction coefficient corresponding to a combination of values of various set optical parameters from the discrepancy correction coefficient table 143, and corrects the conversion coefficient using the discrepancy correction coefficient.

Thus, according to the second embodiment of the present technology, the imaging apparatus 100 can generate the discrepancy correction coefficient for each of the combinations of the imaging lenses and various optical parameters and correct the conversion coefficient based on the discrepancy correction coefficient. Accordingly, the imaging apparatus 100 can detect the focus based on more accurate conditions than the combinations of the imaging lenses and the F values.

The above-described embodiments have been described as examples to realize the present technology, and matters of the embodiments have respective correspondence relations with specific matters of the claims of the present technology. Likewise, the specific matters of the claims of the present technology have respective correspondence relations with matters of the embodiments of the present technology to which the same names are given. However, embodiments of the present technology are not limited to the embodiments, but various modifications of the embodiments may be realized within the scope of the present technology without departing from the gist of the present technology.

Additionally, the present technology may also be configured as below.

(1) A focus detection device including:

a phase difference acquisition unit that calculates an amount of deviation between light-reception amount distributions of a pair of light-receiving element groups arranged in a predetermined direction perpendicular to an optical axis direction as a phase difference;

a conversion coefficient correction unit that corrects a conversion coefficient, representing a ratio of an amount of focus deviation in the optical axis direction to the phase difference when shapes of the light-reception amount distributions are same, according to a degree of discrepancy between the shapes of the light-reception amount distributions; and a defocus amount generation unit that generates the amount of focus deviation as an amount of defocus based on the corrected conversion coefficient and the phase difference.

(2) The focus detection device according to (1), wherein the conversion coefficient correction unit corrects the conversion coefficient based on a discrepancy correction coefficient which is a proportion of the conversion coefficient to a ratio of the amount of defocus to the phase difference when the shapes of the light-reception amount distributions are not the same.

(3) The focus detection device according to (2), further including:

a discrepancy correction coefficient generation unit that calculates the pair of light-reception amount distributions based on lens aperture information indicating a shape and a position of a pupil in a lens and light-reception sensitivity distribution information indicating a distribution of light-reception sensitivities of the pair of light-receiving element groups, and generates the discrepancy correction coefficient based on the pair of light-reception amount distributions.

(4) The focus detection device according to any one of (1) to (3), further including:

a discrepancy correction coefficient table that stores the discrepancy correction coefficient for each value serving as an optical parameter in an optical system, wherein the defocus amount generation unit acquires the discrepancy correction coefficient corresponding to a value set as the optical parameter from the discrepancy correction coefficient table.

(5) The focus detection device according to (4), wherein the optical parameter includes a stop value.

(6) The focus detection device according to (4) or (5), further including:

a discrepancy correction coefficient storage unit that acquires the discrepancy correction coefficient corresponding to the value set as the optical parameter before an instruction to detect focus is given, from the discrepancy correction coefficient table, and stores the discrepancy correction coefficient, wherein, when the instruction to detect the focus is given, the defocus amount generation unit acquires the discrepancy correction coefficient from the discrepancy correction coefficient storage unit.

(7) The focus detection device according to any one of (4) to (6), wherein the discrepancy correction coefficient table stores the plurality of discrepancy correction coefficients in correspondence with combinations of the values of the optical parameter in the optical system and a plurality of lenses, and wherein the defocus amount generation unit acquires the discrepancy correction coefficient corresponding to a combination of the value set as the optical parameter and a mounted lens from the discrepancy correction coefficient table.

(8) The focus detection device according to any one of (1) to (7), further including:

an output level correction unit that uses one of output levels of the pair of light-receiving element groups as a reference value and corrects the other output level to the reference value.

(9) An imaging apparatus including:

a phase difference acquisition unit that calculates an amount of deviation between light-reception amount distributions of a pair of light-receiving element groups arranged in a predetermined direction perpendicular to an optical axis direction as a phase difference;

a conversion coefficient correction unit that corrects a conversion coefficient, representing a ratio of an amount of focus deviation in the optical axis direction to the phase difference when shapes of the light-reception amount distributions are same, according to a degree of discrepancy between the shapes of the light-reception amount distributions; and a defocus amount generation unit that generates the amount of focus deviation as an amount of defocus based on the corrected conversion coefficient and the phase difference;

a focusing unit that focuses a subject based on the amount of defocus; and an imaging unit that images the focused subject.

(10) A method of controlling a focus detection device, the method including:

calculating, by a phase difference acquisition unit, an amount of deviation between light-reception amount distributions of a pair of light-receiving element groups arranged in a predetermined direction perpendicular to an optical axis direction as a phase difference;

correcting, by a conversion coefficient correction unit, a conversion coefficient, representing a ratio of an amount of focus deviation in the optical axis direction to the phase difference when shapes of the light-reception amount distributions are same, according to a degree of discrepancy between the shapes of the light-reception amount distributions; and generating, by a defocus amount generation unit, the amount of focus deviation as an amount of defocus based on the corrected conversion coefficient and the phase difference.

The present disclosure contains subject matter related to that disclosed in Japanese Priority Patent Application JP 2012-199168 filed in the Japan Patent Office on Sep. 11, 2012, the entire content of which is hereby incorporated by reference.

What is claimed is:

1. A focus detection device comprising:
circuitry including:
a phase difference acquisition unit that calculates an amount of deviation between light-reception amount distributions of a pair of light-receiving element groups arranged in a predetermined direction perpendicular to an optical axis direction as a phase difference;
a conversion coefficient correction unit that corrects a conversion coefficient, representing a ratio of an amount of focus deviation in the optical axis direction to the phase difference when shapes of the light-reception amount distributions are same, according to a degree of discrepancy between the shapes of the light-reception amount distributions;
a defocus amount generation unit that generates the amount of focus deviation as an amount of defocus based on the corrected conversion coefficient and the phase difference; and
a discrepancy correction coefficient generation unit that calculates the pair of light-reception amount distributions based on lens aperture information indicating a shape and a position of a pupil in a lens and light-reception sensitivity distribution information indicating a distribution of light-reception sensitivities of the pair of light-receiving element groups, and generates a discrepancy correction coefficient based on the pair of light-reception amount distributions, wherein
the conversion coefficient correction unit corrects the conversion coefficient based on the discrepancy correction coefficient which is a proportion of the conversion coefficient to a ratio of the amount of defocus to the phase difference when the shapes of the light-reception amount distributions are not the same.

2. The focus detection device according to claim 1, further comprising:
a discrepancy correction coefficient table that stores the discrepancy correction coefficient for each value serving as an optical parameter in an optical system,
wherein the defocus amount generation unit acquires the discrepancy correction coefficient corresponding to a value set as the optical parameter from the discrepancy correction coefficient table.

3. The focus detection device according to claim 2, wherein the optical parameter includes a stop value.

4. The focus detection device according to claim 2, further comprising:
a discrepancy correction coefficient storage unit that acquires the discrepancy correction coefficient corresponding to the value set as the optical parameter before an instruction to detect focus is given, from the discrepancy correction coefficient table, and stores the discrepancy correction coefficient,
wherein, when the instruction to detect the focus is given, the defocus amount generation unit acquires the discrepancy correction coefficient from the discrepancy correction coefficient storage unit.

5. The focus detection device according to claim 2,
wherein the discrepancy correction coefficient table stores the plurality of discrepancy correction coefficients in correspondence with combinations of the values of the optical parameter in the optical system and a plurality of lenses, and
wherein the defocus amount generation unit acquires the discrepancy correction coefficient corresponding to a combination of the value set as the optical parameter and a mounted lens from the discrepancy correction coefficient table.

6. The focus detection device according to claim 1, further comprising:
an output level correction unit that uses one of output levels of the pair of light-receiving element groups as a reference value and corrects the other output level to the reference value.

7. An imaging apparatus comprising:
circuitry including:
 a phase difference acquisition unit that calculates an amount of deviation between light-reception amount distributions of a pair of light-receiving element groups arranged in a predetermined direction perpendicular to an optical axis direction as a phase difference;
 a conversion coefficient correction unit that corrects a conversion coefficient, representing a ratio of an amount of focus deviation in the optical axis direction to the phase difference when shapes of the light-reception amount distributions are same, according to a degree of discrepancy between the shapes of the light-reception amount distributions; and
 a defocus amount generation unit that generates the amount of focus deviation as an amount of defocus based on the corrected conversion coefficient and the phase difference;
 a focusing unit that focuses a subject based on the amount of defocus;
 an imaging unit that images the focused subject; and
 a discrepancy correction coefficient generation unit that calculates the pair of light-reception amount distributions based on lens aperture information indicating a shape and a position of a pupil in a lens and light-reception sensitivity distribution information indicating a distribution of light-reception sensitivities of the pair of light-receiving element groups, and generates a discrepancy correction coefficient based on the pair of light-reception amount distributions, wherein
 the conversion coefficient correction unit corrects the conversion coefficient based on the discrepancy correction coefficient which is a proportion of the conversion coefficient to a ratio of the amount of defocus to the phase difference when the shapes of the light-reception amount distributions are not the same.

8. A method of controlling a focus detection device, the method comprising:
calculating, by a phase difference acquisition unit, an amount of deviation between light-reception amount distributions of a pair of light-receiving element groups arranged in a predetermined direction perpendicular to an optical axis direction as a phase difference;
correcting, by a conversion coefficient correction unit, a conversion coefficient, representing a ratio of an amount of focus deviation in the optical axis direction to the phase difference when shapes of the light-reception amount distributions are same, according to a degree of discrepancy between the shapes of the light-reception amount distributions;
generating, by a defocus amount generation unit, the amount of focus deviation as an amount of defocus based on the corrected conversion coefficient and the phase difference; and
calculating with circuitry the pair of light-reception amount distributions based on lens aperture information indicating a shape and a position of a pupil in a lens and light-reception sensitivity distribution information indicating a distribution of light-reception sensitivities of the pair of light-receiving element groups, and generating the discrepancy correction coefficient based on the pair of light-reception amount distributions, wherein
the calculating includes correcting the conversion coefficient based on a discrepancy correction coefficient which is a proportion of the conversion coefficient to a ratio of the amount of defocus to the phase difference when the shapes of the light-reception amount distributions are not the same.

* * * * *